US012769995B2

(12) United States Patent
Yu et al.

(10) Patent No.: US 12,769,995 B2
(45) Date of Patent: Oct. 20, 2026

(54) SYSTEMS AND METHODS FOR METASURFACE SMART GLASS FOR OBJECT RECOGNITION

(71) Applicants: THE TRUSTEES OF COLUMBIA UNIVERSITY IN THE CITY OF NEW YORK, New York, NY (US); WISCONSIN ALUMNI RESEARCH FOUNDATION, Madison, WI (US)

(72) Inventors: Nanfang Yu, Fort Lee, NJ (US); Cheng-Chia Tsai, New York, NY (US); Xiaoyan Huang, New York, NY (US); Zongfu Yu, New York, NY (US); Zhicheng Wu, New York, NY (US)

(73) Assignees: THE TRUSTEES OF COLUMBIA UNIVERSITY IN THE CITY OF NEW YORK, New York, NY (US); WISCONSIN ALUMNI RESEARCH FOUNDATION, Madison, WI (US)

( * ) Notice: Subject to any disclaimer, the term of this patent is extended or adjusted under 35 U.S.C. 154(b) by 140 days.

(21) Appl. No.: 18/317,631

(22) Filed: May 15, 2023

(65) Prior Publication Data

US 2023/0368012 A1 Nov. 16, 2023

Related U.S. Application Data

(60) Provisional application No. 63/341,951, filed on May 13, 2022.

(51) Int. Cl.

*G06N 3/067* (2006.01)
*G02B 5/18* (2006.01)

(52) U.S. Cl.

CPC ............... *G06N 3/067* (2013.01); *G02B 5/18* (2013.01)

(58) Field of Classification Search

CPC ................................. G06N 3/067; G02B 5/18
See application file for complete search history.

(56) References Cited

U.S. PATENT DOCUMENTS

| | | | | |
|---|---|---|---|---|
| 9,739,918 | B2 | 8/2017 | Arbabi et al. | |
| 10,267,957 | B2 | 4/2019 | Kamali et al. | |
| 10,670,782 | B2 | 6/2020 | Arbabi et al. | |
| 11,092,717 | B2 | 8/2021 | Capasso et al. | |
| 11,455,443 | B1 * | 9/2022 | Schubert | G06F 30/23 |
| 12,056,220 | B2 * | 8/2024 | Golaghazadeh | G06N 3/045 |
| 2018/0045953 | A1 | 2/2018 | Fan et al. | |
| 2020/0284967 | A1 | 9/2020 | Schowengerdt et al. | |

(Continued)

OTHER PUBLICATIONS

Metasurface-Enabled On-Chip Multiplexed Diffractive Neural Networks in the Visible—Luo.*

(Continued)

*Primary Examiner* — David E Choi
(74) *Attorney, Agent, or Firm* — Baker Botts L.L.P.

(57) ABSTRACT

The disclosed subject matter provides systems and methods for processing light. An example system can include one or more substrates, and a plurality of meta-units, which are patterned on each of the substrates and configured to modify a phase, an amplitude, or a polarization of the light with a subwavelength resolution. The system can be in a form of a diffractive neural network and be configured to perform target recognition.

18 Claims, 40 Drawing Sheets
(37 of 40 Drawing Sheet(s) Filed in Color)

(56) References Cited

U.S. PATENT DOCUMENTS

| | | | | |
|---|---|---|---|---|
| 2021/0012184 | A1* | 1/2021 | Rodrigues | G01S 7/4802 |
| 2021/0109364 | A1 | 4/2021 | Ajeta et al. | |
| 2021/0142170 | A1* | 5/2021 | Ozcan | G06N 3/0455 |
| 2022/0253685 | A1* | 8/2022 | Ozcan | G06N 3/084 |
| 2022/0327371 | A1* | 10/2022 | Ozcan | G02B 27/4277 |
| 2023/0162016 | A1* | 5/2023 | Ozcan | G06N 3/084 706/15 |
| 2023/0237790 | A1* | 7/2023 | Valentine | G06V 10/7715 382/157 |
| 2023/0316081 | A1* | 10/2023 | Sandler | G06N 3/0499 706/21 |
| 2023/0368012 | A1* | 11/2023 | Yu | G02B 5/18 |
| 2023/0401436 | A1* | 12/2023 | Ozcan | G02B 27/4272 |
| 2025/0111219 | A1* | 4/2025 | Magden | G06N 3/0675 |
| 2025/0200351 | A1* | 6/2025 | Spall | G06N 3/084 |
| 2025/0349117 | A1* | 11/2025 | Huang | G06V 10/82 |
| 2025/0355136 | A1* | 11/2025 | Hadler | G02B 1/002 |

OTHER PUBLICATIONS

Colburn et al., "Metasurface optics for full-color computational imaging," Scientific Advances, vol. 4 / Issue 2, 6 pages (2018).

Khoram et al., "Nanophotonic media for artificial neural inference," Photonics Research, vol. 7 / Issue 8, 823-827 (2019).

Leonard et al., "Co-Design of Free-Space Metasurface Optical Neuromorphic Classifiers for High Performance," ACS Photonics, vol. 8 / Issue 7, 2103-2111 (2021).

Li et al., "Polarization multiplexed diffractive computing: all-optical implementation of a group of linear transformations through a polarization-encoded diffractive network," Light: Science & Applications, vol. 11 / Issue 1 (2022).

Liu et al., "A programmable diffractive deep neural network based on a digital-coding metasurface array," Nature Electronics, vol. 5, 113-122 (2022).

Luo et al., "Metasurface-enabled on-chip multiplexed diffractive neural networks in the visible," Light: Science & Applications, vol. 11 / Issue 1, 11 pages (2022).

Maier et al., "Wavelength-tunable microbolometers with metamaterial absorbers," Optic Letters, vol. 34 / Issue 19, 3012-3014 (2009).

Ogawa et al., "Wavelength- or Polarization-Selective Thermal Infrared Detectors for Multi-Color or Polarimetric Imaging Using Plasmonics and Metamaterials," Materials (Basel), vol. 10 / Issue 5, 16 pages (2017).

Papaioannou et al., "All-Optical Image Recognition Using Metamaterials," Frontiers in Optics (2016).

Qian et al., "Dynamic recognition and mirage using neuro-metamaterials," Nature Communications, vol. 13 / Issue 1 (2022).

Sui et al., "A Review of Optical Neural Networks," IEEE Access. Apr. 2020; 8: pp. 70773-70783.

Tan et al., "3D Imaging Using Extreme Dispersion in Optical Metasurfaces," ACS Photonics, vol. 8 / Issue 5, 1421-1429 (2021).

Weng et al., "Meta-neural-network for real-time and passive deep-learning-based object recognition," Nature Communications, vol. 11 / Issue 1, 8 pages (2020).

Zangeneh-Nejad et al., Analogue computing with metamaterials, Nat Rev Mater. Mar. 2021; 6: pp. 207-225.

Zarei et al., "Integrated photonic neural network based on silicon metalines," Optics Express, vol. 28 / Issue 24, 36668-36684 (2020).

Zhang et al., "Reconfigurable Metasurface for Image Processing," Nano Letters, vol. 21 / Issue 20, 8715-8722 (2021)—Abstract Only—with Supporting Information for: Reconfigurable Metasurface for Image Processing, 9 pages.

* cited by examiner

SYSTEMS AND METHODS FOR METASURFACE SMART GLASS FOR OBJECT RECOGNITION

CROSS-REFERENCE TO RELATED APPLICATION

This application claims priority to U.S. Provisional Patent Application No. 63/341,951, which was filed on May 13, 2022, the entire contents of which are incorporated by reference herein.

GRANT INFORMATION

This invention was made with government support under grant numbers FA8650-20-1-7028 awarded by the Air Force Research Laboratory. The government has certain rights in the invention.

BACKGROUND

Object recognition can be exploited in a wide range of applications, such as image annotation, vehicle counting and tracking, pedestrian detection, and facial detection and recognition. Using digital images from cameras and videos and machine learning models, computer vision recognizes objects by translating high-dimensional visual signals from the real world into lower-dimensional representations. The full technology stack in this approach requires a compound optical system to form images, an optoelectronic sensor for analog-to-digital conversion, and digital processors to implement artificial neural networks (ANNs). Consequently, the resulting system can be bulky and power-hungry, react slowly due to the latency between technology modules, and be vulnerable to cyber-attack.

An optical neural network (ONN) can use photonic elements and circuits to form a layered architecture emulating that of digital ANNs to directly process optical signals from target objects. Here, the wide electromagnetic spectrum, from the ultraviolet to the microwave, is regarded "optical", and "light" can be understood as electromagnetic waves within this broad spectral range. Similarly "photonic" can be equivalent to "electromagnetic". For certain ONNs, the pixels of diffractive layers provide insufficient subwavelength sizes and can not simultaneously modulate all properties of light (phase, amplitude, and polarization), which can limit the expressive power of these ONNs. Furthermore, the utility of the neural networks can be hampered by their large dimensions and a lack of wide availability of spatial light modulators and certain sources and detectors, such as those operating in the terahertz frequency range.

These problems can be exacerbated as the demand for high power efficiency, computational speed, and data security increases rapidly with the explosion of data volume and the wide availability of mobile devices with computer vision features. Furthermore, such neuromorphic computing based on photonics remains a challenge due to the difficulty of training and manufacturing sophisticated photonic structures to support neural networks with adequate expressive power.

As such, there is a need in the art for improved target recognition based on processing light waves from a target.

SUMMARY

The disclosed subject matter provides a system techniques for processing light waves directly from a target for the purpose of target recognition. The systems can include one or more substrates and a plurality of meta-units. The meta-units can be patterned on each of the substrates and configured to modify an optical phase, an amplitude, or a polarization of the light with a subwavelength resolution. The system can be in a form of a diffractive neural network and be configured to perform target recognition.

In certain embodiments, the light can be scattered by a target. In certain embodiments, the target can be a two-dimensional image. In certain embodiments, the target can be a three-dimensional object.

In certain embodiments, the light can include a wavelength between an ultraviolet region to a microwave spectral region.

In certain embodiments, the system can be configured to operate without a power supply. In non-limiting embodiments, the system can be configured to operate at the speed of light. In some embodiments, the system can be configured to recognize a target. In some embodiments, the system can be configured to bypass digitalization of a target so that it is immune against security breaches.

In certain embodiments, the plurality of meta-units can include a dielectric material. The dielectric material can include silicon, silicon nitride, silicon-rich silicon nitride, titanium dioxide, plastics, plastics doped with ceramic powders, ceramics, polytetrafluoroethylene (or PTFE), FR-4 (a glass-reinforced epoxy laminate material), or combinations thereof.

In certain embodiments, the plurality of meta-units can include an actively tunable material. The actively tunable material can include an electro-optical material, a thermo-optical material, a phase change material, or combinations thereof. The electro-optical material can include silicon and/or lithium niobate. The thermo-optical material can include silicon and/or germanium. The phase change material can include vanadium dioxide.

In certain embodiments, the plurality of meta-units can have a cross-section with a four-fold symmetry and form an isotropic library. In non-limiting embodiments, the plurality of meta-units can have a cross-section with a two-fold symmetry and form a birefringent library.

In certain embodiments, the system can include an output plane that includes at least one detection zone. In certain embodiments, the system is configured to recognize a target by scattering light into one specific detection zone on the output layer more efficiently compared to scattering light into other detection zones.

In certain embodiments, the system can be configured to recognize a target by scattering light into an optical barcode in the form of a specific intensity distribution over the detection zones on the output plane.

In certain embodiments, the system can further include one or more detectors of the light.

The disclosed subject matter provides methods for processing light. An example method can include propagating light scattered from a target onto an output plane through a diffractive neural network and identifying the target based on detecting the light intensity distribution on the output plane by using one or more detectors. The diffractive neural network can include one or more substrates and a plurality of meta-units, patterned on each of the substrates and configured to modify a phase, an amplitude, or a polarization of the light. In non-limiting embodiments, the method can further include identifying the target based on detecting a light intensity distribution on the output plane by using one or more detectors.

In certain embodiments, the plurality of meta-units can form an optically isotropic library or a birefringent library.

The isotropic library can include meta-units having a cross-section with a four-fold symmetry. The birefringent library can include meta-units having a cross-section with a two-fold symmetry.

In certain embodiments, the diffractive neural network can be fabricated by lithographic planar fabrication, micro-machining, or 3D printing.

In certain embodiments, the method can further include training the diffractive neural network in an iterative way, wherein each iteration can include feeding a training set comprising one or more two-dimensional images or three-dimensional objects into the diffractive neural network, calculating the propagation of light waves through the diffractive neural network, obtaining an intensity distribution over the detection zones on the output plane, and evaluating a loss function, wherein the loss function can be a discrepancy between the calculated intensity distribution over the detection zones and a target-specific optical barcode, and adjusting the choice and arrangement of meta-unit on each of the substrates to minimize the loss function.

In certain embodiments, the method can further include choosing the configuration of the diffractive neural network, including the wavelength of light, the incident angle and wavefront of light, the number and size of the substrates, the spacing between the substrates, the number and footprint of meta-units on each substrate, the spacing between the last substrate and the output plane, and the number and arrangement of detection zones on the output plane, to achieve the maximum target recognition accuracy.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8B shows detection zones on the output layer for recognizing 4 classes of handwritten digits {0, 1, 3, 4} in the MNIST database. FIG. 8C shows a photo of a fabricated metasurface device. FIG. 8D shows an SEM image of a portion of the device. FIG. 8E shows an example showing the recognition of the handwritten digit "3. " FIG. 8F shows a confusion matrix summarizing experimental results of recognizing handwritten "0'", "1", "3," and "4" with an accuracy of 98.3%.

FIG. 10 provides photos that represent the same individual with the following conditions: 1. Neutral expression, 2. Smile, 3. Anger, 4. Scream, 5. Left light on, 6. Right light on, 7. All sides light on, 8. Wearing sunglasses, 9. Wearing sunglasses and left light on, 10. Wearing sunglasses and the right light on, 11. Wearing a scarf, 12. Wearing a scarf and left light on, and 13. Wearing a scarf and the right light on.

Figures 1A, 1B, 1C, 1D:
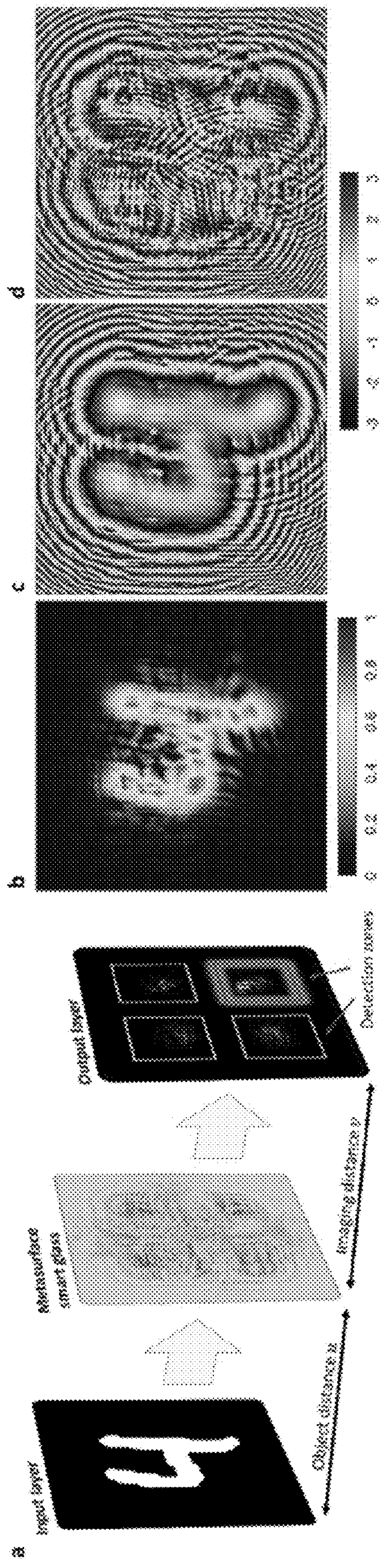
FIG. 1A provides a schematic diagram illustrating that a smart glass or a diffractive neural network channels light from an input image preferentially onto one of several detection zones on the output plane.
FIGS. 1B and 1C show the amplitude and phase profiles over the optical wavefront generated by the image (a hand-written "4") before it enters the metasurface smart glass.
FIG. 1D shows a modulated phase distribution over the optical wavefront as it exits the metasurface.

It is to be understood that both the foregoing general description and the following detailed description are exemplary and are intended to provide further explanation of the disclosed subject matter

DETAILED DESCRIPTION

The presently disclosed subject matter provides techniques for processing light for the purpose of target recognition. The disclosed techniques provide systems and methods for recognizing a target by processing light scattered from the target.

Unless otherwise defined, all technical and scientific terms used herein have the same meaning as commonly understood by one of ordinary skill in the art. In case of conflict, the present document, including definitions, will control. Certain methods and materials are described below, although methods and materials similar or equivalent to those described herein can be used in the practice or testing of the presently disclosed subject matter. The materials, methods, and examples disclosed herein are illustrative only and not intended to be limiting.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, up to 10%, up to 5%, and up to 1% of a given value. Alternatively, particularly with respect to biological systems or processes, the term can mean within an order of magnitude, within 5-fold, and within 2-fold of a value.

In certain embodiments, the presently disclosed subject matter provides a system for processing light. An example system can include one or more substrates and at least one meta-unit. The meta-units can be coupled to the substrate to form a metasurface, which can spatially and spectrally control the phase, amplitude, or polarization of light with a subwavelength resolution. The latter refers to a dimension that ranges from 5% to 99% of the free-space wavelength.

The term "coupled," as used herein, refers to the connection of a device component to another device component by methods known in the art. For example, the meta-units can be coupled to the substrate through electron beam lithography, deep UV lithography, imprint lithography, or other methods known in the art. The type of coupling used to connect two or more device components can depend on the scale and operability of the device.

In certain embodiments, the disclosed system can process the light scattered from a target. For example, the disclosed system can be configured to recognize or identify a target by processing or analyzing light scattered from, reflected from, or transmitted through the target. In non-limiting embodiments, the target can be an image, a three-dimensional object, a material, or anything that can scatter light.

In certain embodiments, the disclosed system can form a diffractive optical neural network (ONN) based on one or more metasurfaces that can recognize targets by directly processing light waves scattered from the targets. In non-limiting embodiments, the metasurfaces can include a two-dimensional array of meta-units and perform precise control of optical wavefront with subwavelength resolution.

In certain embodiments, the disclosed system can be configured to operate without a power supply or a digital processor. For example, the ONN can be entirely passive, requiring no additional power after the optical input (e.g., light scattered from an object) is generated. In non-limiting embodiments, the disclosed system can be configured to perform as a passive computing device that operates at the speed of light (e.g., speed of light in vacuum divided by the effective refractive index of the ONN). For example, after the disclosed system receives an optical input (e.g., light scattered from an object), the disclosed metasurfaces can modify the light as the optical input pass through the metasurfaces and identify the object.

In certain embodiments, the substrate can be transparent to light. In non-limiting embodiments, the substrate can include a glass substrate, a plastic substrate, a silicon substrate, or other material that is transparent to light.

In certain embodiments, the meta-units can include a passive dielectric material. The passive dielectric material can include silicon, silicon dioxide, titanium dioxide, silicon nitride, silicon-rich silicon nitride, or combinations thereof. In certain embodiments, the meta-units can contain an actively tunable material. The actively tunable material can include an electro-optical material, such as silicon and lithium niobate, a thermo-optical material, such as silicon and germanium, and a phase change material, such as vanadium dioxide. In non-limiting embodiments, the actively tunable materials can perform dynamic tuning of the optical response of the meta-units and dynamic modification of the optical wavefront. In non-limiting embodiments, the dielectric material can include silicon, silicon nitride, silicon-rich silicon nitride, titanium dioxide, plastics, plastics doped with ceramic powders, ceramics, polytetrafluoroethylene (or PTFE), FR-4 (a glass-reinforced epoxy laminate material), or combinations thereof.

In certain embodiments, the meta-units can be patterned on each of the substrate surfaces and be configured to spatially modulate the light. For example, a plurality of meta-units can form an isotropic library. Within this library, all meta-units are optically isotropic: the phase response of any meta-unit is a constant irrespective of the polarization state of the incident light. For example, if a meta-unit has a circular cross-section, the meta-unit is optically isotropic. As another example, if the cross-section of a meta-unit has a four-fold symmetry, the meta-unit is optically isotropic. In non-limiting embodiments, the plurality of meta-units can form a birefringent library. Within this library, all meta-units are optically birefringent: the phase response of any meta-unit can have two completely different phase responses for two orthogonal polarization states of the incident light. If the cross-section of a meta-unit has a two-fold symmetry, the meta-unit is optically birefringent. One can use the meta-units from the birefringent library to create metasurfaces that provide distinct phase modulations for light polarized in orthogonal directions.

In some embodiments, the optical amplitude can be controlled by the degree of structural birefringence of meta-units, while the optical phase can be controlled by the in-plane orientation of the birefringent meta-units. In certain embodiments, the optical dispersion of meta-units (i.e., their phase and amplitude responses as a function of wavelength) can be engineered by controlling the size and shape of the meta-unit cross-sections. For example, a single metasurface can encode distinct optical amplitude-phase profiles at different wavelengths.

In certain embodiments, the disclosed system can include an output plane. The light passes through the disclosed system (e.g., one or more metasurfaces) and can propagate onto the output plane. In non-limiting embodiments, the output plane can include one or more detection zones. The disclosed system can be configured to concentrate the highest intensity of the light scattered by the target to one detection zone corresponding to the identity of the target. In non-limiting embodiments, the system can recognize a target by scattering light into a predetermined detection zone on the output layer more efficiently compared to scattering light into other detection zones.

In certain embodiments, the location of the detection zones can be modified. For example, the output plane can include 9 detection zones arranged into a 3-by-3 array or arranged into a circular pattern. The disclosed system can convert an image (e.g., a facial photo) into a 3-by-3 optical barcode according to the amount of optical power that falls onto the 9 detection zones. In non-limiting embodiments, the system can recognize a target by scattering light into an optical barcode in the form of a specific intensity distribution over the at least one detection zones on the output plane.

In non-limiting embodiments, the disclosed system can be configured to recognize objects by directly processing light waves scattered from the targets. For example, the disclosed system can form a diffractive optical neural network (ONN) based on metasurfaces (e.g., single-layered or multi-layered) that can modulate the phase, amplitude, and/or polarization over the optical wavefront for recognizing optically-coherent targets (e.g., hand-written digits, English alphabetic letters, human facial photos, etc.). An input target (e.g., a hand-written digit), upon excitation of an incident coherent light beam, can generate an optical wavefront with characteristic amplitude and phase profiles. This complex optical wavefront, propagating over a certain distance (i.e., object distance), is then processed by a metasurface, which superimposes a phase modulation to the wavefront. The modulated light wave further propagates over a certain distance (i.e., imaging distance) in the forward direction and produces an optical diffraction pattern that lights up a few predefined zones on the detection plane. The zone that receives the highest optical intensity, in this particular example, identifies the initial target. In non-limiting embodiments, the input target, the metasurface, and the detection plane represent, respectively, an input layer, a hidden layer, and an output layer of a neural network, and every pixel in either one of the three layers represent an artificial neuron. The size of the neurons can range from subwavelength to many times of the wavelength. In this configuration, each neuron in the hidden layer can be connected to all the neurons in the input layer via optical interference, and each neuron in the output layer is similarly connected to all the neurons in the hidden layer. The optical interference can provide a form of nonlinear activation by generating cross-products of optical wavelets. The phase modulation at each neuron of the hidden layer represents a trainable linear transformation.

In certain embodiments, the disclosed system can perform recognition of four classes of hand-written digits with an accuracy exceeding 99% and recognition of ten classes of hand-written digits with an accuracy of approximately 80%. In non-limiting embodiments, the disclosed single-layered polarization-multiplexing smart glasses can solve more complex tasks, for example, recognizing alphabetical letters using light at one polarization state and their typographic styles (i.e., normal or italic) using light at the orthogonal polarization state with accuracies exceeding 90%. In some embodiments, the disclosed metasurface smart glass doublets can perform advanced recognition tasks and demonstrate human facial verification with an accuracy of approximately 80%, which is comparable to that achieved by conventional digital, artificial neural networks (ANN) with three convolutional layers.

In certain embodiments, the disclosed system can include a double-layered metasurface. For example, the disclosed system can include the second substrate and the second plurality of meta-units, patterned on the second substrate and configured to modify the optical phase, amplitude, and/or polarization of the light. In addition to the first metasurface, the second metasurface layer, including the second substrate and second plurality of meta units, can form a metasurface doublet. In non-limiting embodiments, the system, including the metasurface doublet, can handle tasks that can require metasurfaces with enhanced expressive power. For example, the disclosed system can translate a gray-scale image into a low-dimensional representation, allowing one to compare two distinct images (e.g., of human faces) and determine if they belong to the same category (e.g., decide whether the images represent the same person). The metasurface doublet can map an image into a 3×3 intensity array on the detection plane, and the similarity between two images is evaluated by calculating the Euclidean distance, or dissimilarity, between the two resulting intensity arrays. For example, if the Euclidean distance is below a threshold, the two images can be considered to belong to the same category. If the distance is above the threshold, the two images can be considered to represent distinct categories.

In certain embodiments, the system further includes additional metasurfaces (e.g., third metasurface, fourth surface, etc.). The additional metasurface can include an additional substrate and an additional plurality of meta-units, wherein the additional plurality of meta-units is patterned on the additional substrate and configured to modify the optical phase, amplitude, and/or polarization of the light. In some embodiments, the system can be configured to bypass digitalization of a target so that it is immune against security breaches.

In certain embodiments, the disclosed subject matter provides methods for processing light. An example method can include propagating light scattered from an object/target onto an output plane through the disclosed smart glass/diffractive neural network and identifying the object/target based on detecting the light intensity distribution on the output plane by using one or more detectors. The smart glass can include a substrate and a plurality of meta-units, patterned on the substrate and configured to modify the optical phase, amplitude, and/or polarization of the light. In non-limiting embodiments, the plurality of meta-units can form an isotropic library or a birefringent library. The isotropic library can have a cross-section with a four-fold symmetry, and the birefringent library can have a cross-section with a two-fold symmetry. In non-limiting embodiments, the diffractive neural network can be fabricated by lithographic planar fabrication, micromachining, or 3D printing.

In certain embodiments, the method can further include training the disclosed system (e.g., smart glass or diffractive neural network) in an iterative way. For example, object recognition can be accomplished by training all the neurons in the hidden layer to maximize the light intensity within a specific zone of the output layer, depending on the classification label of the input object. For example, during the training process, optically coherent, binary images (e.g., hand-written digits and alphabetic letters) can be fed into the neural network, and propagation of light waves through the diffractive network can be numerically computed using the diffraction theory. A loss function can be defined to evaluate the cross-entropy between the calculated intensity distribution over the detection plane and the target intensity distribution (e.g., 1 for the zone that matches with the label of the input and 0 elsewhere). The phase profile of the metasurface can be iteratively adjusted using a large number of input objects during the training process, where the loss function is minimized by a stochastic gradient-based optimization method.

In non-limiting embodiments, during each iteration of the training, each iteration can include feeding a training set comprising one or more two-dimensional images or three-dimensional objects into the diffractive neural network, calculating the propagation of light waves through the diffractive neural network, obtaining an intensity distribution over the detection zones on the output plane, evaluating a loss function, wherein the loss function is a discrepancy between the calculated intensity distribution over the detection zones and a target-specific optical barcode, and adjusting the choice and arrangement of meta-unit on each of the substrates to minimize the loss function.

In certain embodiments, several measures can be taken to improve the robustness of the ONN against experimental errors. For example, non-uniform optical illumination to the input objects, random mispositioning of the input object, smart glass, and detection zones, and random variations of the object and imaging distances can be included in the training process; an auxiliary term proportional to the ratio between the intensity in the predefined zones of the detection plane and the total intensity in the detection plane can be subtracted from the overall loss function to increase the contrast of the zones of interest over the optical background.

In certain embodiments, the method can include converting the light scattered from a target into an optical barcode in the form of a specific intensity distribution over the detection zones on the output plane. The optical barcode can include a plurality of detection zones. For example, the optical barcode shape can include 9 detection zones (e.g., 3 by 3) on the output plane, so that the disclosed device can convert a target into a 3 by 3 optical barcode according to the amount of optical power that falls onto the 9 detection zones.

In certain embodiments, the method can further include choosing a configuration of the diffractive neural network to improve a target recognition accuracy. In non-limiting embodiments, the configuration can includes a wavelength of light, an incident angle, a wavefront of light, a number and size of the substrates, a spacing between the substrates, a number and a footprint of meta-units on each substrate, a spacing between a last substrate and the output plane, a number and arrangement of detection zones on the output plane, or combinations thereof.

EXAMPLES

Example 1: Metasurface Smart Glass for Object Recognition

The disclosed subject matter provides a diffractive ONN based on metasurfaces, dubbed a metasurface "smart glass," that directly processes light waves scattered by an object using its internal nanostructures. A metasurface is a 2D version of a metamaterial that utilizes strong interactions between light and 2D nanostructured thin films to control light in desired ways, realizing device functions such as flat lenses and holograms. Metasurfaces are typically composed of a 2D array of nano-pillars (i.e., "meta-units") of various cross-sectional shapes and can offer complete and precise manipulation of optical phase, amplitude, and polarization across the wavefront with sub-wavelength resolution.

The collective response of millions of sub-wavelength meta-units enables efficient parallel computing with a high level of expressive power; as a result, tasks typically solved using a complex, multi-layered network can be accomplished by the disclosed smart glass using a metasurface singlet or doublet. The metasurfaces can be manufactured by CMOS-compatible nanofabrication techniques and can enable miniaturization of the discrete-layered diffractive neural networks operating in the optical spectral range, where the light sources and detectors are readily available. The disclosed metasurface smart glasses do not need any power supply or digital processor: they can act as passive computing devices that operate at the speed of light.

The computational capacity of metasurface-based diffractive networks was assessed by experimentally demonstrating smart glasses for a few recognition tasks using single-layered metasurfaces that modulate the phase and polarization of the optical wavefront. The recognition of four classes of hand-written digits was achieved with an accuracy exceeding 99%, and the recognition of ten classes of hand-written digits with an accuracy of approximately 80%. The single-layered polarization-multiplexing smart glasses were implemented to solve more complex tasks, for example, recognizing alphabetical letters using light at one polarization state and their typographic styles (i.e., normal or italic) using light at the orthogonal polarization state with accuracies exceeding 90%. The capability of metasurface smart glass doublets in performing advanced recognition tasks was assessed, and human facial verification was demonstrated with an accuracy of approximately 80%, which is comparable to that achieved by a conventional digital ANN with three convolutional layers.

Training and experimental implementation of single-layered metasurface smart glass: FIG. 1*a* illustrates a metasurface smart glass using a specific example. An input object, a hand-written digit "4", upon excitation of an incident coherent light beam, generates an optical wavefront with characteristic amplitude and phase profiles (FIGS. 1*b* and 1*c*). This complex optical wavefront, propagating over a certain distance (i.e., object distance), is then processed by a metasurface, which superimposes a phase modulation to the wavefront (FIG. 1*d*). The modulated light wave further propagates over a certain distance (i.e., imaging distance) in the forward direction and produces an optical diffraction pattern that lights up a few predefined zones on the detection plane. The zone that receives the highest optical intensity, in this particular example, identifies the initial object. The input object, the metasurface, and the detection plane represent, respectively, an input layer, a hidden layer, and an output layer of a neural network, and every pixel in either one of the three layers represents an artificial neuron.

In this configuration, each neuron in the hidden layer is connected to all the neurons in the input layer via optical interference, and each neuron in the output layer is similarly connected to all the neurons in the hidden layer. The optical interference provides a form of nonlinear activation by generating cross-products of optical wavelets. The phase modulation at each neuron of the hidden layer represents a trainable linear transformation. Object recognition is accomplished by training all the neurons in the hidden layer to maximize the light intensity within a specific zone of the output layer, depending on the classification label of the input object.

FIG. 1 shows the operation of a metasurface smart glass for object recognition. FIG. 1A shows a schematic illustrating that a smart glass channels light from an input image preferentially onto one of several detection zones on the output plane. The yellow arrows indicate the direction of light propagation. The squares on the output plane define the detection zones where the zone (highlighted in red) corresponding to the identity of the input object receives the highest share of intensity. FIGS. 1B and 1C show the amplitude and phase profiles over the optical wavefront generated by the object (a hand-written "4") before it enters the metasurface smart glass. FIG. 1D shows the modulated phase distribution over the optical wavefront as it exits the metasurface. FIG. 1E shows a schematic of the operation mechanism of the disclosed device. FIGS. 1F-1G show microscopic photos of plates containing input objects (hand-written digits and typed letters) and alignment marks. The plates are composed of apertures defined on an opaque photomask. An array of objects is reimaged on the input plane by a ×1 telescope and filtered by an aperture to allow light from a single object to propagate to the metasurface, as shown in FIG. 1E. FIG. 1H shows the phase responses of meta-units in the isotropic library, where m denotes the index of the meta-units. FIG. 1I shows a phase response of meta-units in the birefringent library. Each blue circle represents one meta-unit. Red solid circles represent a few exemplary meta-units illustrated below. FIGS. 1J and 1K shows SEM images of fabricated metasurfaces consisting of isotropic and birefringent meta-units, respectively.

This disclosed ONN is designed for near-infrared light at λ=1,550 nm. The input object and the metasurface smart glass both have a dimension of 500λ×500λ and are digitized into 1000×1000 pixels. The object and imaging distances are both 2000λ. The smart glass is composed of a single metasurface modeled as a phase mask with zero thickness on a substrate with a thickness of 322.58λ (~500 μm) and a refractive index of 1.44 (silicon dioxide). During the training process, optically coherent, binary images (e.g., hand-written digits and alphabetic letters) are fed into the neural network and propagation of light waves through the diffractive network is numerically computed using the Rayleigh-Sommerfeld diffraction theory. A loss function can be defined to evaluate the cross-entropy between the calculated intensity distribution over the detection plane and the target intensity distribution, which is 1 for the zone that matches with the label of the input and 0 elsewhere. The phase profile of the metasurface is iteratively adjusted using a large number of input objects during the training process, where the loss function is minimized using the "Adam" optimization algorithm adapted from the stochastic gradient-based optimization method.

Several measures are taken to improve the robustness of the ONN against experimental errors. For example, non-uniform optical illumination to the input objects, random mispositioning of the input object, smart glass, and detection zones, and random variations of the object and imaging distances are included in the training process; an auxiliary term proportional to the ratio between the intensity in the predefined zones of the detection plane and the total intensity in the detection plane is subtracted from the overall loss function to increase the contrast of the zones of interest over the optical background.

Figure 1F:
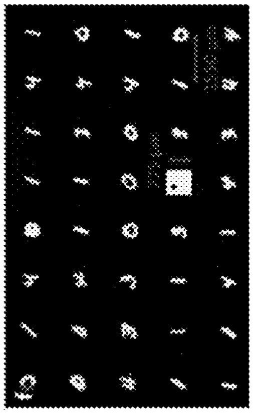
FIGS. 1F and 1G show microscopic photos of plates containing input targets (hand-written digits and typed letters) and alignment marks.
Figure 1G:
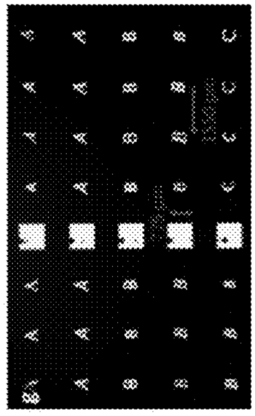
Figure 1E:
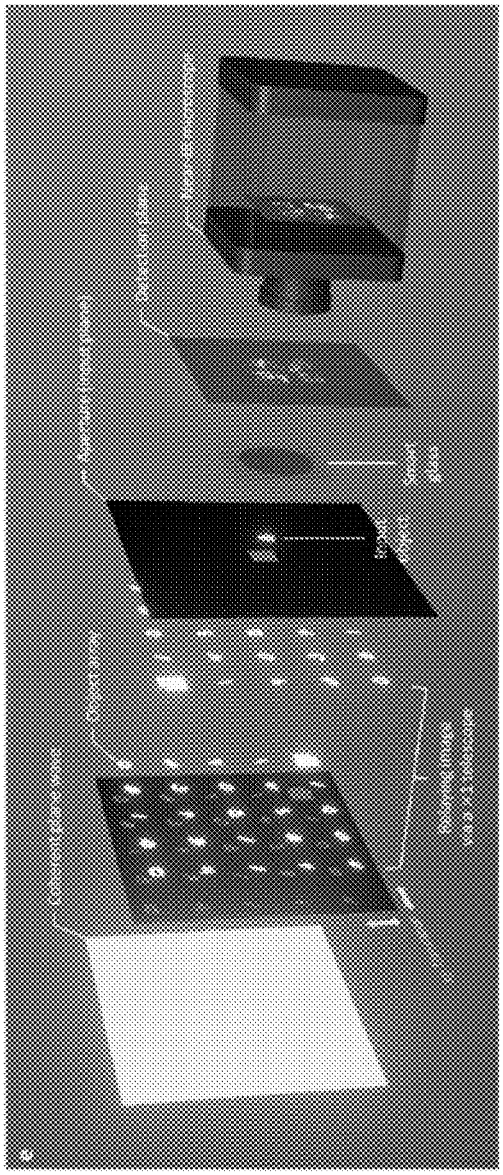
FIG. 1E shows a schematic of the operation an example device.
Figure 1J:
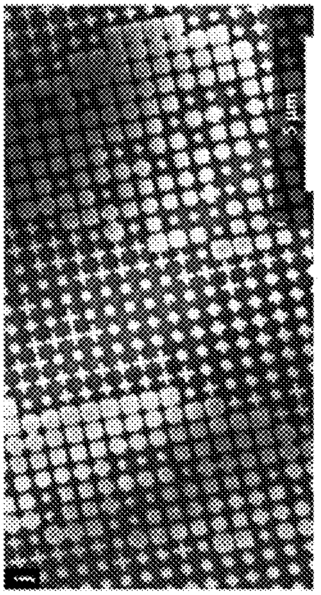
FIGS. 1J and 1K show scanning electron microscope (SEM) images of fabricated metasurfaces consisting of isotropic and birefringent meta-units, respectively.
Figure 1K:
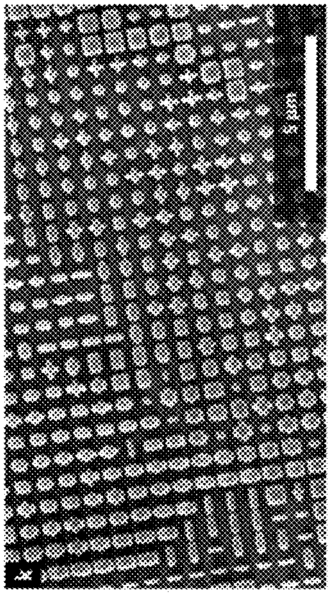

A schematic of an example experimental setup is shown in FIG. 1*e*. A telecom laser beam (λ=1,550 nm) is incident on a photomask to create input optical objects. The photomask is made of a black emulsion photo-plotted on a mylar sheet, containing a 2D array of objects (i.e., numerical digits or alphabetic letters) that are transparent within an object and opaque outside of it (FIGS. 1*f* and 1*g*). The incident beam has a diameter of approximately 3 mm, which is much larger than the size of individual input objects (0.775 mm×0.775 mm), to minimize non-uniformity in illumination. A motorized translation stage each time moves one input object to the central axis of the optical setup. The input object is relayed by a telescope with unity magnification, and the relayed object is superimposed onto a square aperture (0.775 mm×0.775 mm) so that stray light from adjacent input objects on the photomask is blocked. The diffraction pattern of the object is then processed by the metasurface smart glass, and the output image is collected by a microscope with an objective focused on the detection plane and measured by an InGaAs camera. The optical intensities in the predefined detection zones are extracted from the image, and the identity of the input object is predicted according to the zone receiving the highest intensity.

Figure 1I:
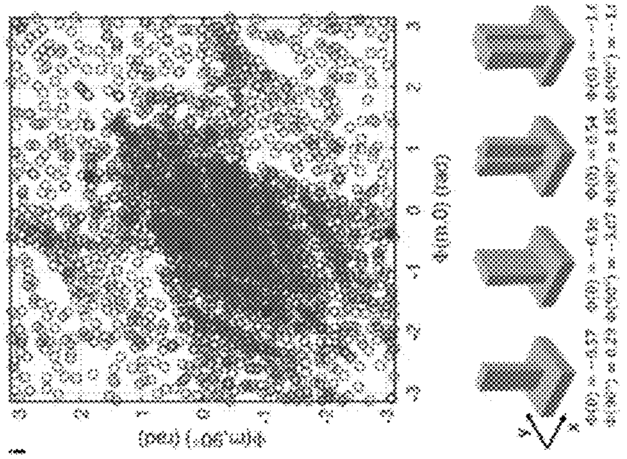
FIG. 1I shows the phase responses of meta-units in the birefringent library.
Figure 1H:
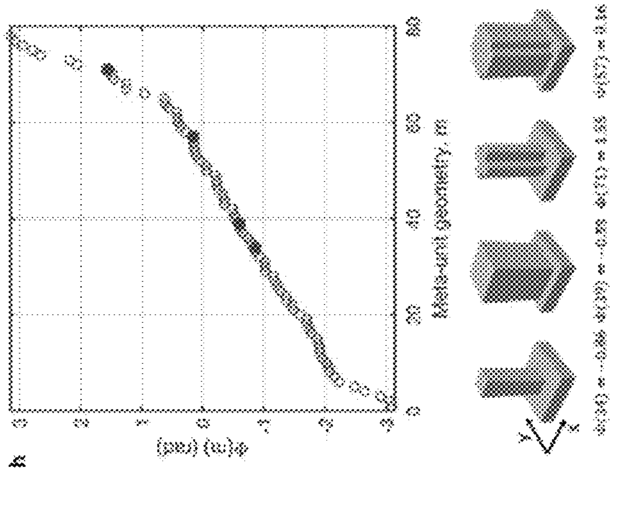
FIG. 1H shows the phase responses of meta-units in the isotropic library, where m denotes the index of the meta-units.

The metasurface is made of amorphous silicon for its low extinction coefficient in the near-infrared and is composed of meta-units 1 μm in height and arranged in a square lattice with a periodicity of 750 nm on a silicon dioxide substrate. The phase responses of two meta-unit libraries used in this work are shown in FIGS. 1*h* and 1*i*. The meta-units in one library have a cross-section with four-fold symmetry and are thus optically isotropic; those in the other library have a cross-section with two-fold symmetry and can introduce form birefringence and thus distinct phase responses for incident light with orthogonal polarization states. To test polarization-multiplexing smart glasses, a linear polarizer is inserted in front of the photomask, and an object is tested twice with incident light at two orthogonal polarization states. Experimental characterization of the metasurface smart glasses is conducted with 10-40 distinct objects for each classification label to estimate the accuracy of object recognition. The tested objects are haphazardly chosen from a dataset excluded from the dataset used in training.

Figure 2C:
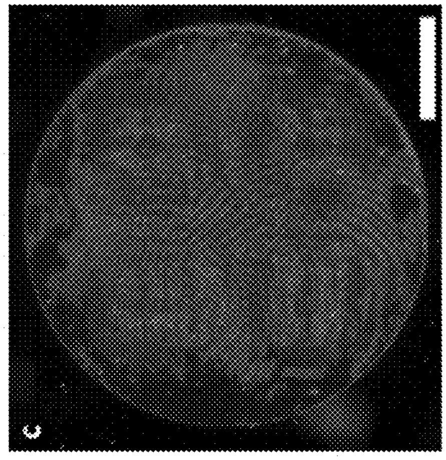
FIG. 2C shows an optical microscopic photo.
Figure 2D:
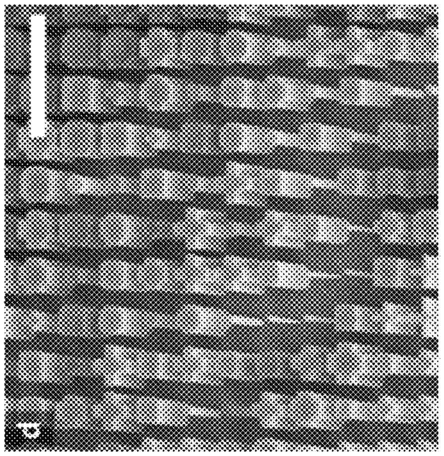
FIG. 2D shows an SEM image of the fabricated metasurface.
Figure 2A:
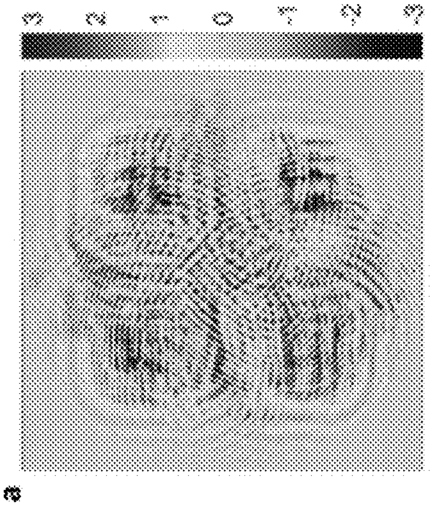
FIG. 2A provides trained phase modulation on the metasurface for recognizing four classes of hand-written digits.
Figure 2B:
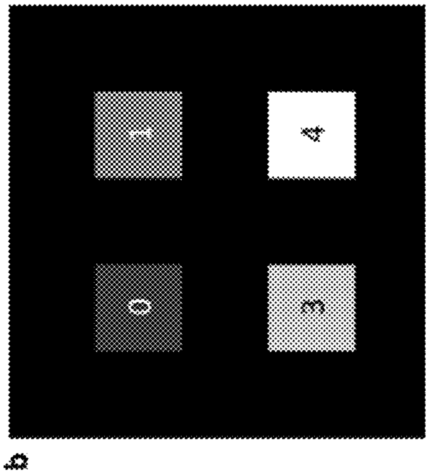
FIG. 2B shows detection zones on the output plane.
Figure 2E:
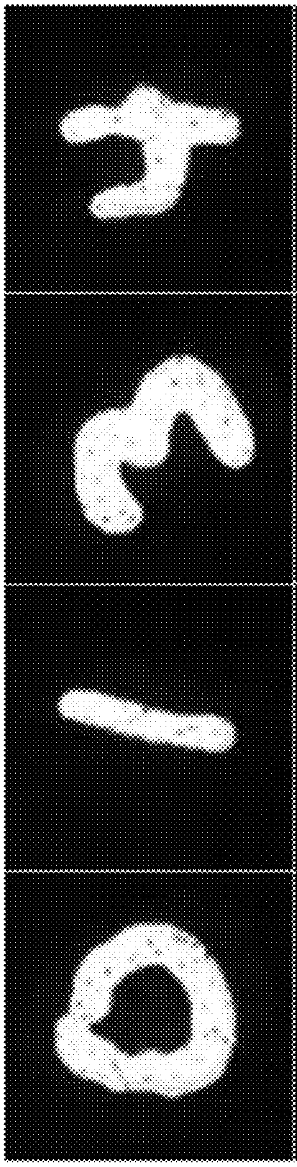
FIGS. 2E-2G shows example images showing the recognition of four hand-written digits, "0", "1", "3", and "4", where FIG. 2E are the inputs digits, FIG. 2G are the computer-simulated intensity distributions over the output plane, and FIG. 2F are the experimentally measured intensity distributions over the output plane.
Figure 2F:
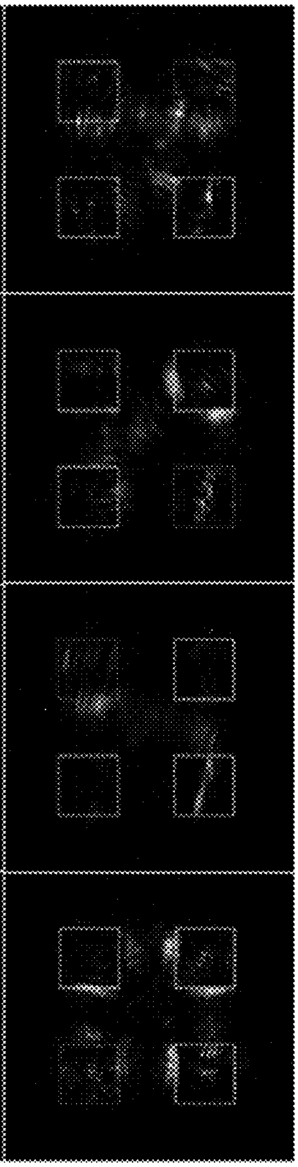
Figure 2G:
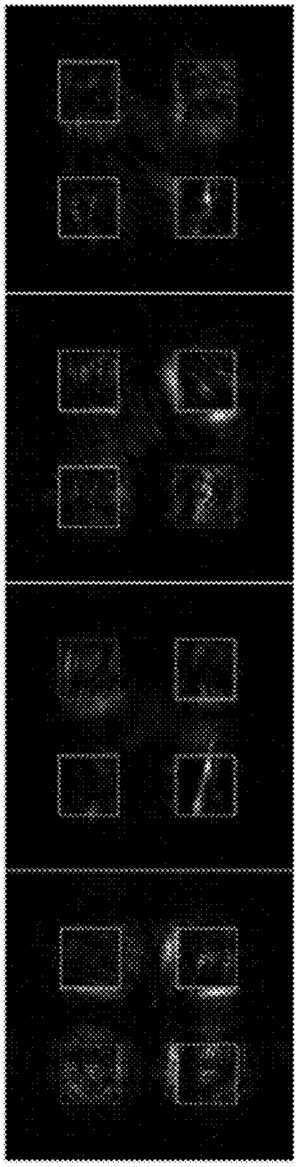
Figure 2H:
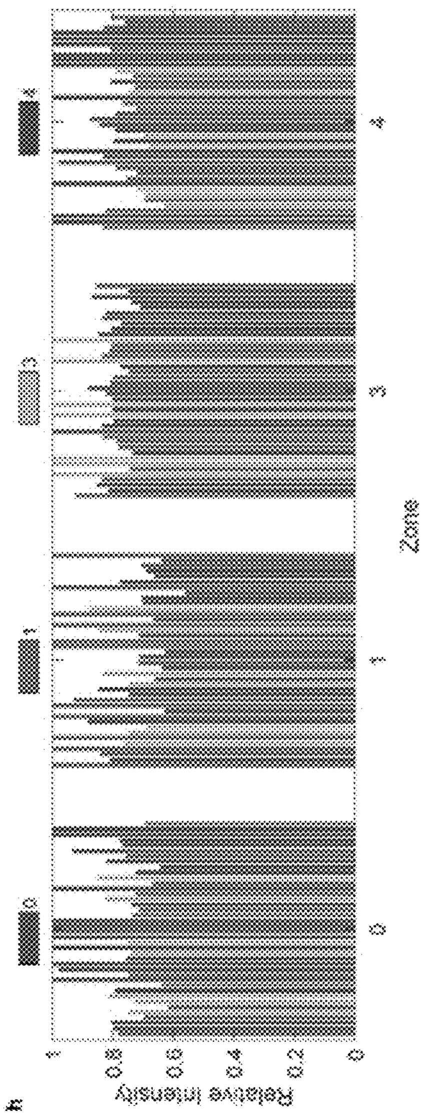
FIG. 2H shows computer-simulated integrated intensities of the four detection zones for 40 randomly selected input digits, with the highest value normalized to 1.
Figure 2I:
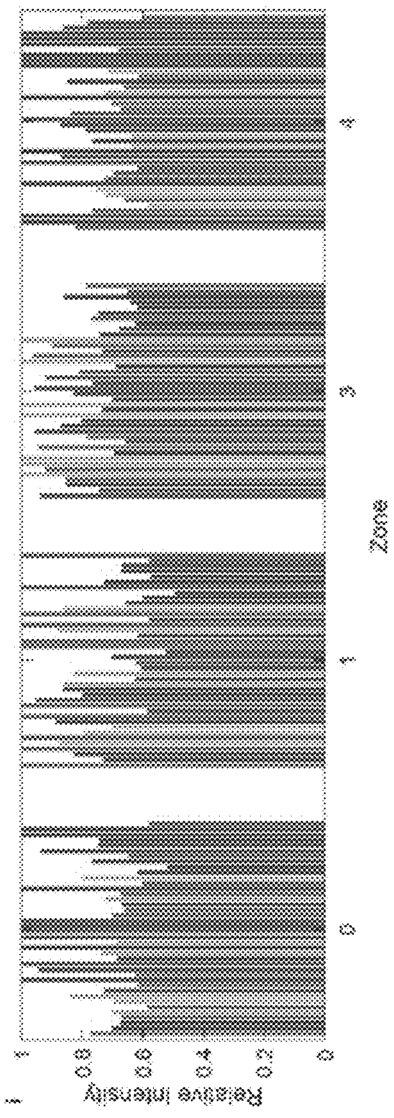
FIG. 2I shows experimentally measured integrated intensities of the four detection zones for the same 40 digits as those shown in FIG. 2H, with the highest value normalized to 1.
Figure 2J:
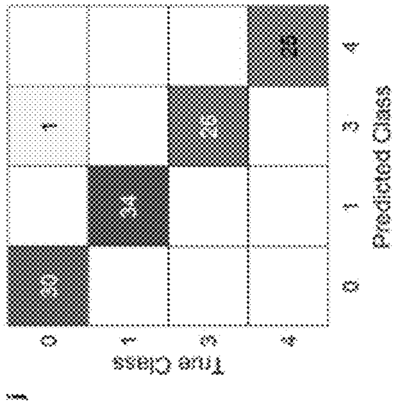
FIGS. 2J and 2K show confusion matrices summarizing the theoretical and experimental results of recognizing 116 hand-written "0", "1", "3", and "4", respectively.
Figure 2K:
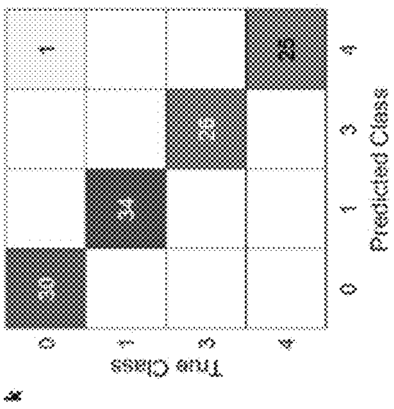

Smart glasses for recognition of hand-written digits: The first functionality is the reorganization of 4 classes of numerical digits, {0, 1, 3, 4}, from the MNIST hand-written digit database. The phase modulation (FIG. 2*a*) is trained to concentrate light scattered from the binary image of a digit into one of the four square zones on the detection plane as defined in FIG. 2*b*. The trained phase modulation is implemented by a metasurface (FIG. 2*c*) based on meta-units that are optically isotropic (FIG. 2*d*); correspondingly, the polarization state of the incident laser beam is not controlled. FIGS. 2*e-g* show a few exemplary classification cases where the metasurface smart glass successfully classifies digits on the basis of the resulting intensity distributions on the detection plane. The observed diffraction patterns on the detection plane (FIG. 2*f*) agree well with analytically calculated diffraction patterns (FIG. 2*g*), indicating that the metasurface provides a precise phase modulation consistent with the design. Training of a single-layered digital ANN simulating the architecture of this ONN reports an accuracy of 99.14% (FIG. 2*j*), while measurement of 116 input digits (4 classes and N>25 for each class) results in a recognition accuracy of 99.14% (FIG. 2*k*). The raw data of optical intensity integrated over the four detection zones in the training and testing processes are summarized in the bar charts in FIGS. 2*h* and 2*i*, showing good agreement between theoretical and experimental results. The zone corresponding to the correct identity of the digit has an integrated intensity approximately 22% higher than that of the other three zones; this large inter-zone intensity difference ensures the robustness of the disclosed ONN against experimental variations.

Figure 3A:
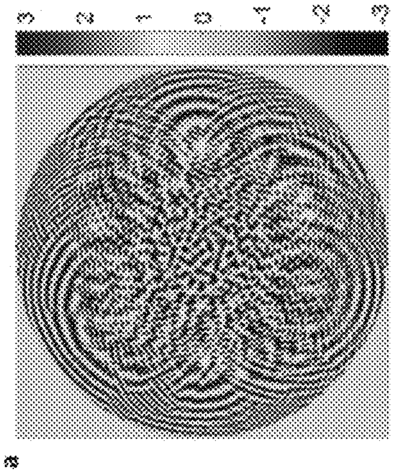
FIG. 3A provides the trained phase modulation on a metasurface based on optically isotropic meta-units for recognizing all 10 classes of hand-written digits.
Figure 3B:
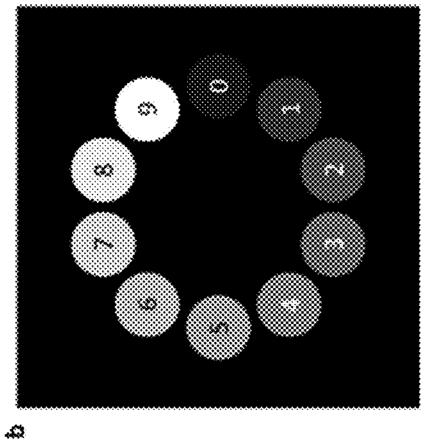
FIG. 3B shows detection zones on the output plane.
Figure 3C:
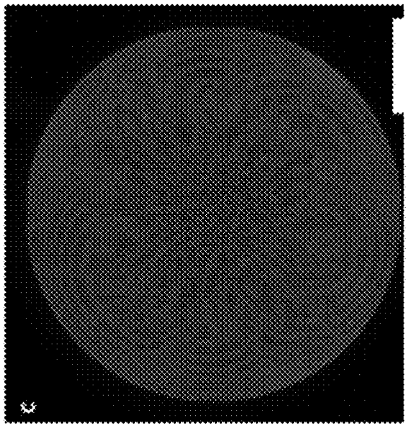
FIG. 3C shows an optical microscopic photo.
Figure 3D:
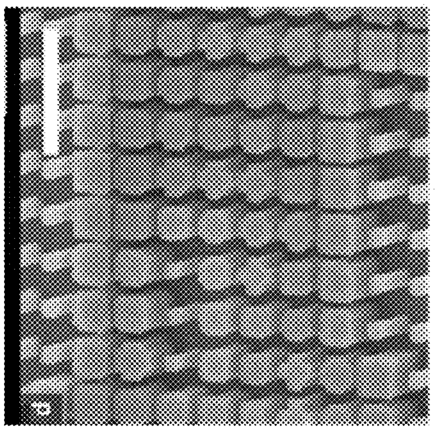
FIG. 3D shows an SEM image of the fabricated metasurface.
Figures 3E, 3F, 3G:
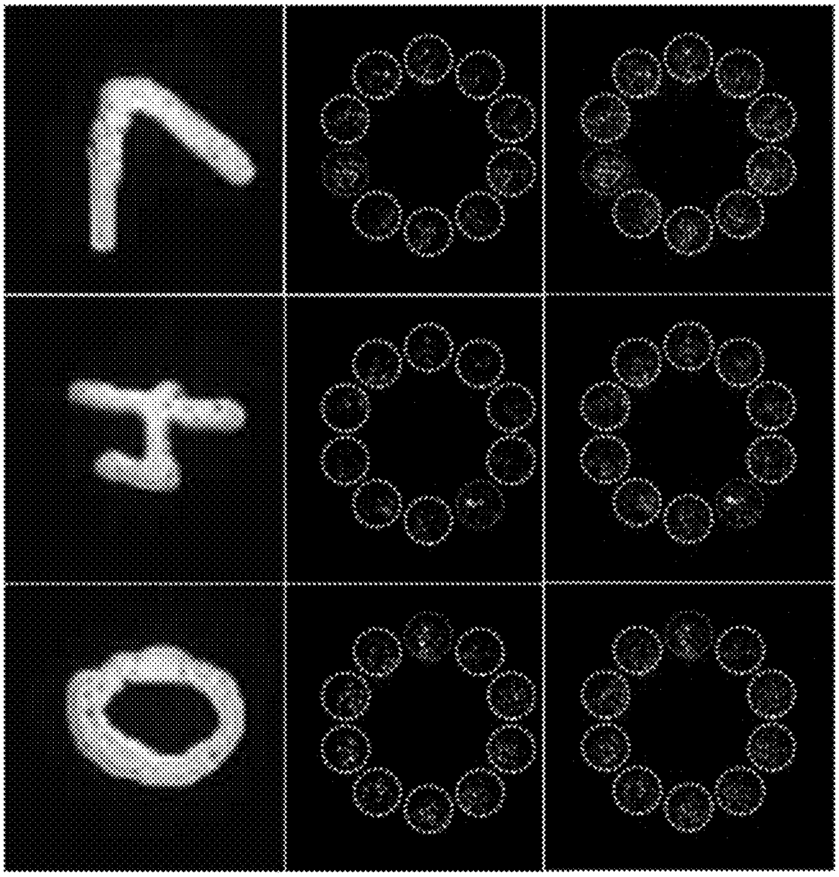
FIGS. 3E-3G show examples showing the recognition of three hand-written digits, "0", "4", and "7", where FIG. 3E are the inputs digits, FIG. 3G are the computer-simulated intensity distributions over the output plane, and FIG. 3F are the experimentally measured intensity distributions over the output plane.
Figure 3H:
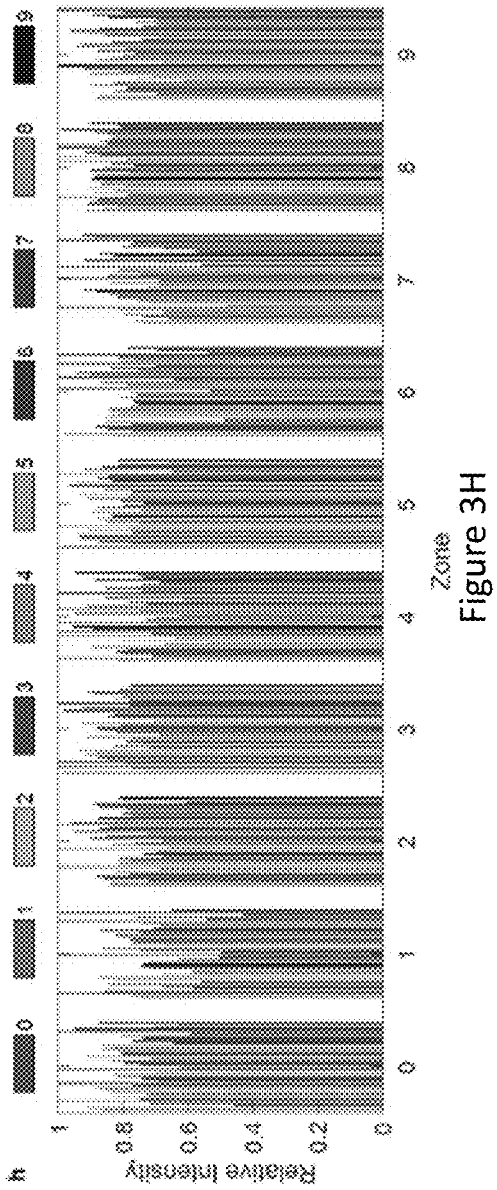
FIG. 3H shows computer-simulated integrated intensities of the 10 detection zones for 40 randomly selected input digits, with the highest value normalized to 1.
Figure 3I:
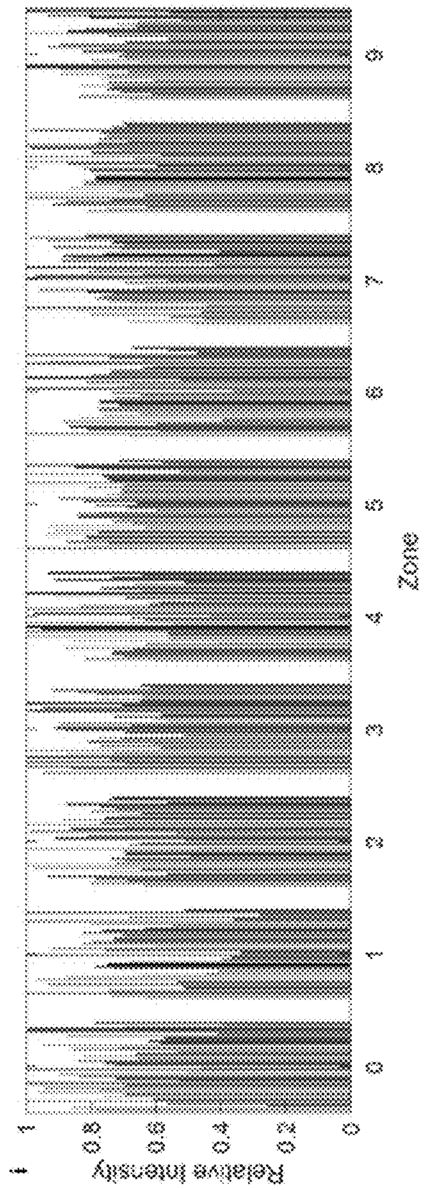
FIG. 3I shows experimentally measured integrated intensities of the 10 detection zones for the same 40 digits as those shown in FIG. 3H.
Figure 3J:
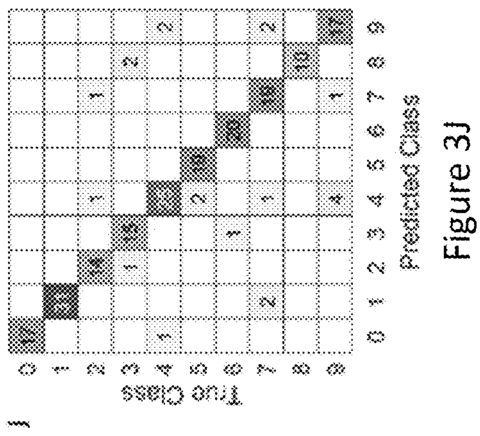
FIGS. 3J and 3K show confusion matrices summarizing the theoretical and experimental results of recognizing 208 hand-written digits, respectively.

Classification of all 10 classes of hand-written digits was assessed using a single-layered metasurface smart glass. The trained optical phase profile of the metasurface is shown in FIG. 3*a*, and it is implemented similarly using a metasurface based on optically isotropic meta-units (FIG. 3*d*). The 10 circular detection zones are arranged in a circular array on the detection plane (FIG. 3*b*). Three examples of classification are shown in FIGS. 3*e-g*. This ONN has an experimental recognition accuracy of 78.37% (FIGS. 3*i* and 3*k*) based on the measurement of 208 input digits (10 classes and N>10 for each class). The experimental accuracy is lower than the theoretical accuracy of 86.50% (FIGS. 3*h* and 3*j*) according to the results of the training process, suggesting that the ONN has reduced robustness against experimental errors. In fact, the intensity contrast between the detection zones with the highest intensity and the second-highest intensities reduces to ~10% (FIGS. 3*h* and 3*i*) as the number of zones increases to 10, making the ONN more susceptible to experimental errors such as the non-uniformity of the incident beam, and mispositioning of the components and the detection zones of the ONN.

FIG. 3 shows the recognition of 10 classes of hand-written numerical digits. FIG. 3A shows the trained phase modulation on the metasurface. FIG. 3B shows the detection zones on the output plane. FIG. 3C shows the microscopic optical photo, and FIG. 3D shows an SEM image of the fabricated metasurface: Scale bars: 200 μm in (c) and 2 μm in (d). FIGS. 3E-3G show examples showing the recognition of three hand-written digits, "0", "4", and "7": (e) Input images; (f) Measured intensity distributions on the output plane showing that the detection zone (red) corresponding to the true classification of the digits has the highest integrated optical intensity. (g) Analytically calculated intensity distributions on the output plane show a high degree of consistency with the measured results. FIG. 3H shows the theoretically integrated intensities of the 10 detection zones for 40 randomly selected input digits, with the highest value normalized to 1. The colors of the bars represent the true classification of the digits. FIG. 3I shows the experimental integrated intensities of the 10 detection zones for the same 40 digits as those shown in (h). FIGS. 3J and 3K show the confusion matrices summarizing the theoretical and experimental results of recognizing 208 hand-written digits, respectively.

Figure 3K:
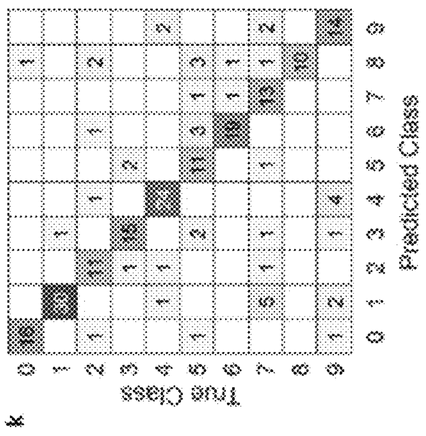
Figure 4A:
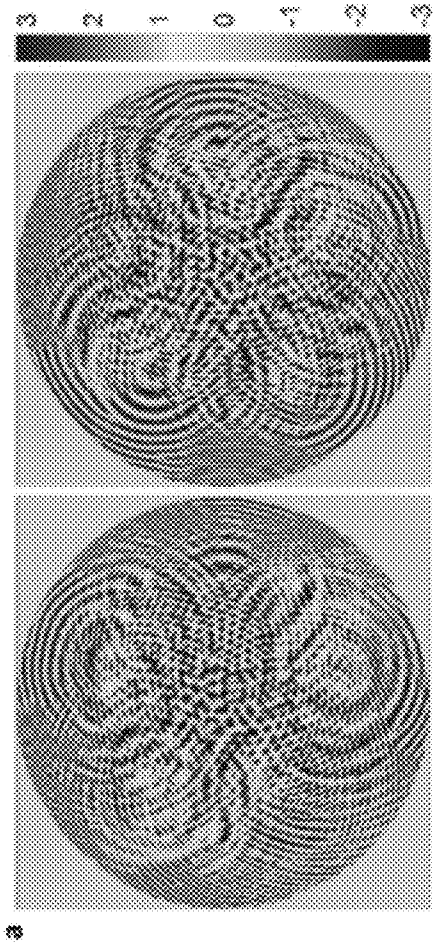
FIG. 4A provides the trained phase modulations on a metasurface based on birefriengent meta-units for recognizing all 10 classes of hand-written digits.
Figure 4B:
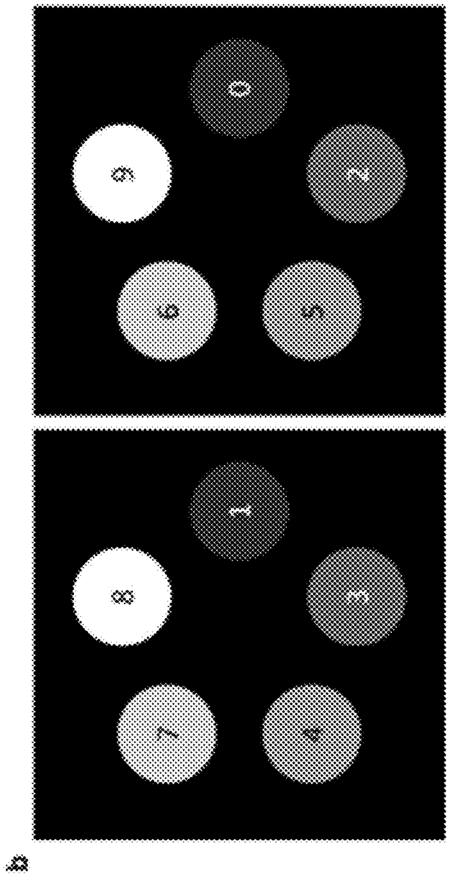
FIG. 4B shows arrangements of detection zones on the output plane at two orthogonal incident polarizations for recognizing, respectively, two groups of digits: {1, 3, 4, 7, 8} and {0, 2, 5, 6, 9}.
Figure 4E:
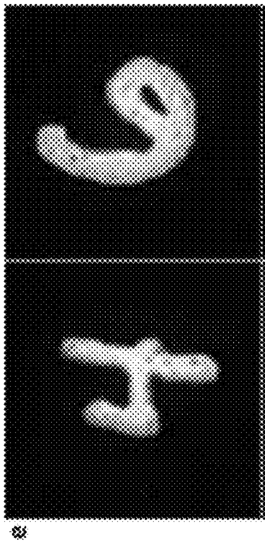
FIGS. 4E-4G show examples showing the recognition of hand-written "4" and "6" using light with orthogonal polarization states, where FIG. 4E are the inputs digits, FIG. 4G are the computer-simulated intensity distributions over the output plane, and FIG. 4F are the experimentally measured intensity distributions over the output plane.
Figure 4F:
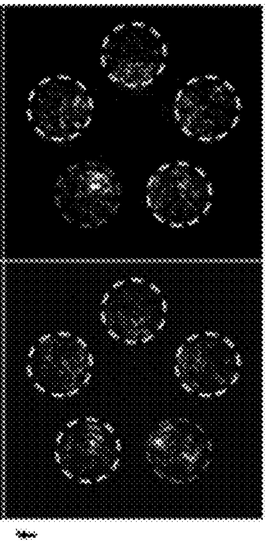
Figure 4G:
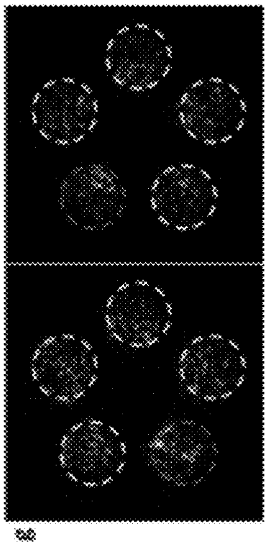
Figure 4C:
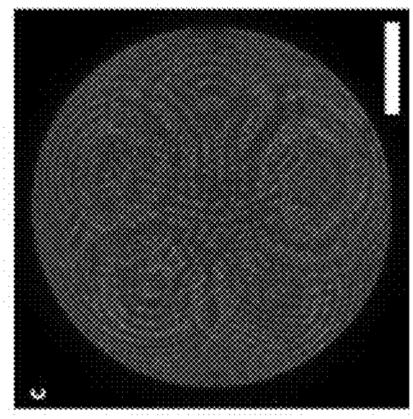
FIG. 4C shows an optical microscopic photo.
Figure 4D:
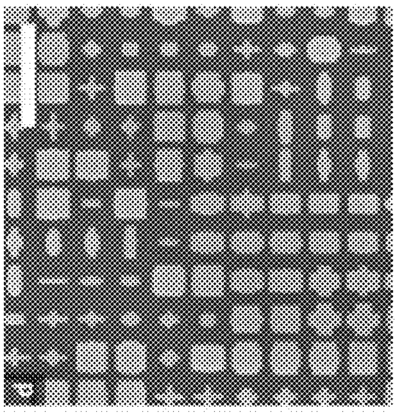
FIG. 4D shows an SEM image of the fabricated metasurface.
Figure 4I:
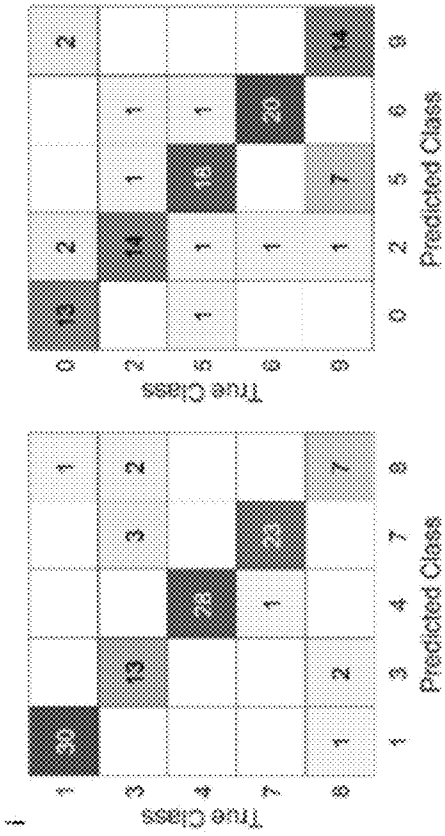
FIGS. 4H and 4I show confusion matrices at two orthogonal polarization states summarizing the theoretical and experimental results of recognizing 208 hand-written digits, respectively.
Figure 4H:
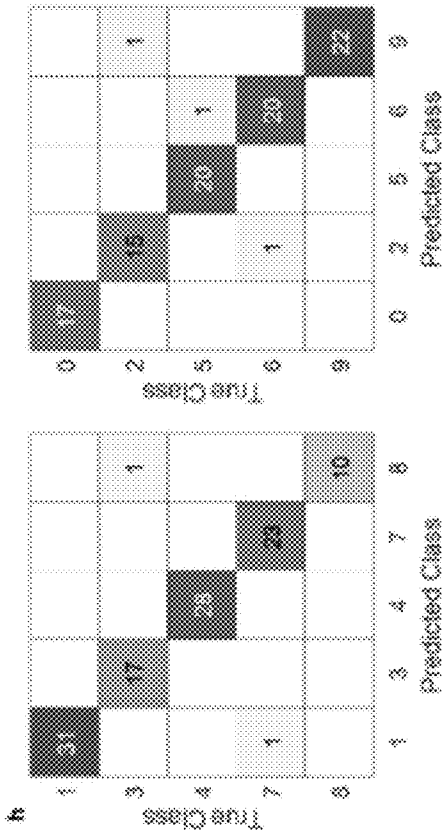

Polarization multiplexing and multitasking smart glasses: 10-digit recognition is computationally a more expensive task than categorizing only 4 classes of digits. A polarization-multiplexing technique was used to reduce the complexity of the task by dividing the 10 digits into two groups and performing the recognition task using light linearly polarized in orthogonal directions: horizontally polarized light for recognizing digits {1, 3, 4, 7, 8} and vertically polarized light for recognizing digits {0, 2, 5, 6, 9}. The smart glass is constructed using the birefringent meta-unit library (FIG. 1*i*) to provide distinct phase modulations for light polarized in orthogonal directions (FIG. 4*a*). Two examples for recognizing digits "4" and "6" are illustrated in FIGS. 4*e-g*. The training process reports accuracies attaining 94.80% and 94.00% for the two groups of digits, respectively (FIG. 4*h*); recognition accuracies achieved based on measurement of 111 input digits belonging to the first group and 97 digits belonging to the second group are 90.99% and 81.44%, respectively (FIG. 4*i*), which are substantially higher than that of the non-birefringent device (FIG. 3*k*).

The phase coverage provided by the birefringent meta-unit library is more discrete than that of the isotropic meta-unit library; therefore, the phase responses of the fabricated birefringent metasurface deviate from the desired phase profiles more than does the non-birefringent device. This issue can be addressed by including more archetypes of meta-units in the library (only rectangle and cross motifs are used currently). The function demonstrated in FIG. 4 is not entirely 10-class classification because a digit is pre-categorized into one of two groups. An ONN composed of a single birefringent metasurface with a dimension of 1000×1000 pixels can have insufficient expressive power to experimentally accomplish the 10-class classification task with an accuracy higher than 90%.

FIG. 4 shows the recognition of 10 classes of hand-written numerical digits using a polarization-multiplexing smart glass. FIG. 4A shows the trained phase modulations on the metasurface, and FIG. 4B shows the arrangements of detection zones on the output plane at two orthogonal incident polarizations for recognizing, respectively, two groups of digits: {1, 3, 4, 7, 8} and {0, 2, 5, 6, 9}. FIG. 4C shows an optical microscopic photo, and FIG. 4D shows an SEM image of the fabricated metasurface: Scale bars: 200 μm in (c) and 2 μm in (d). FIGS. 4E-4G show two examples showing the recognition of hand-written "4" and "6" using light with orthogonal polarization states: (e) Input images; (f) Measured intensity distributions on the output plane showing that the detection zone (red) corresponding to the true classification of the digits has the highest integrated optical intensity. FIG. 4G shows analytically calculated intensity distributions on the output plane, showing a high degree of consistency with the measured results. FIGS. 4H and 4I show the confusion matrices at two orthogonal polarization states summarizing the theoretical and experimental results of recognizing 208 hand-written digits, respectively.

Polarization multiplexing was performed to realize a multi-tasking metasurface smart glass that classifies typed alphabetical letters and simultaneously distinguishes the typographic styles of the letters (FIG. 5). Specifically, when incident illumination is polarized in the horizontal direction, scattered light from a letter with a certain font is modulated by the smart glass to preferentially light up one of the four zones on the detection plane, corresponding to 4 letters: {A, B, C, D}; scattered light polarized in the vertical direction, however, falls in one of the two zones in the upper row to indicate if the letter is normal or italic. Experiments using 168 inputs (4 letters each with 21 fonts and 2 typographic styles) demonstrate accuracies of 92.81% and 100% for letter classification and typographic style recognition, respectively (FIG. 5*j*).

FIG. 5 shows the recognition of identity and typographic style of four classes of letters using a polarization-multiplexing smart glass. FIG. 5A shows the trained phase modulations on the metasurface, and FIG. 5B shows the arrangements of detection zones on the output plane at two orthogonal incident polarizations for the two distinct recognition tasks. FIG. 5C shows an optical microscopic photo, and FIG. 5D shows an SEM image of the fabricated metasurface: Scale bars: 200 μm in (c) and 2 μm in (d).

Figure 5A:
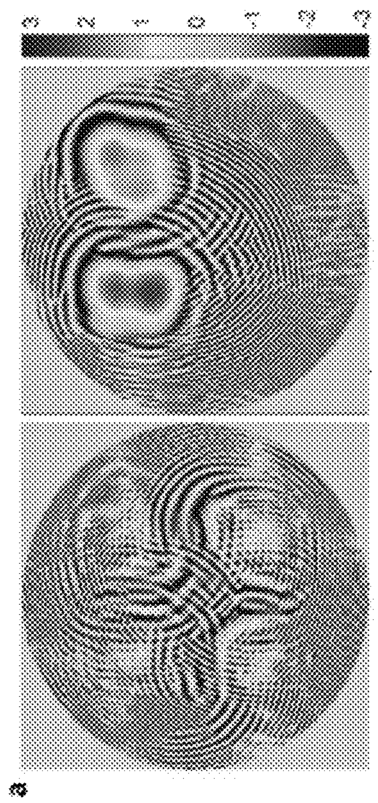
FIG. 5A shows the trained phase modulations on a metasurface based on birefriengent meta-units for recognizing letters with different fonds and whether the letters are normal or italicized.
Figure 5B:
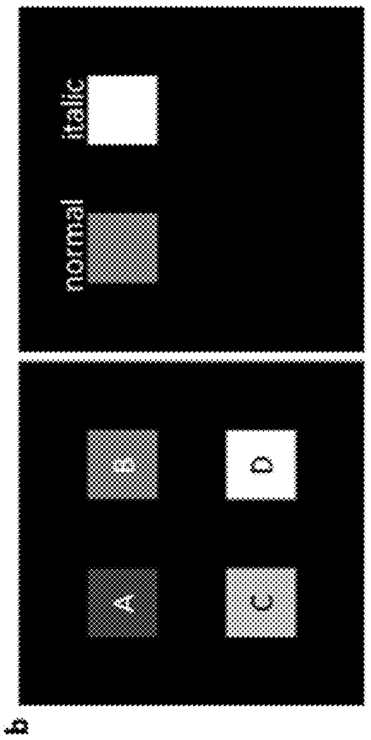
FIG. 5B shows arrangements of detection zones on the output plane at two orthogonal incident polarizations for the two distinct recognition tasks.
Figure 5C:
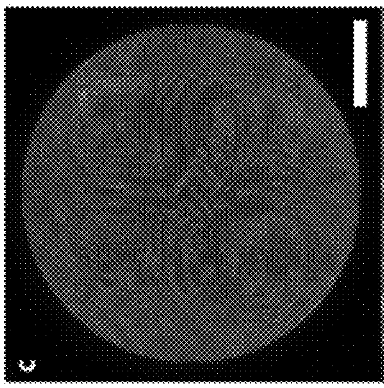
FIG. 5C shows an optical microscopic photo.
Figure 5D:
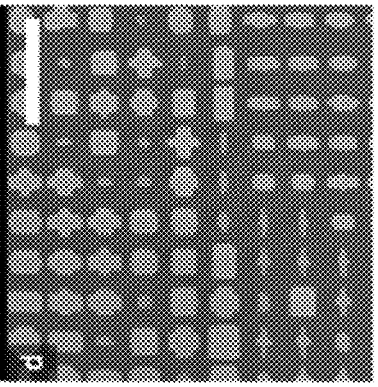
FIG. 5D shows an SEM image of the fabricated metasurface.
Figure 5F:
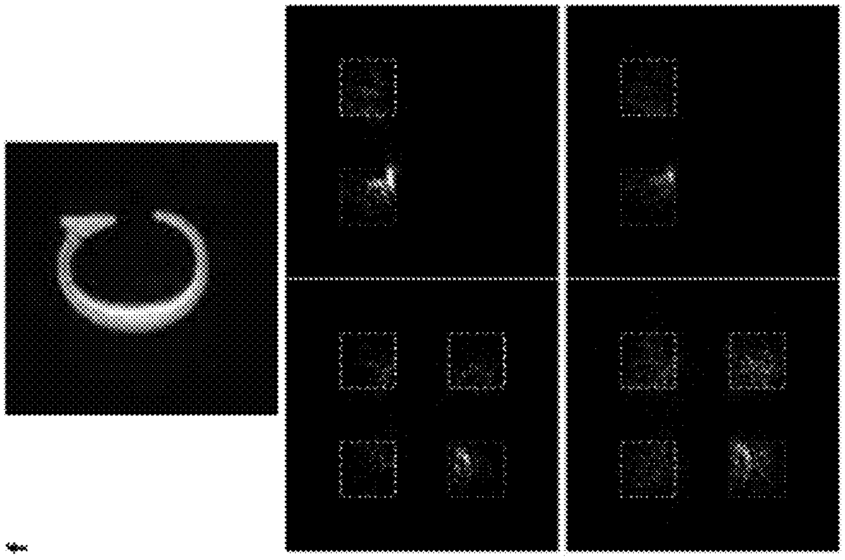
FIGS. 5E-5F show examples showing the recognition of an italicized "A" and a normal "C", where the top rows are the inputs digits, the middle rows are the experimentally measured intensity distributions over the output plane, and the bottom rows are the computer-simulated intensity distributions over the output plane.
Figure 5E:
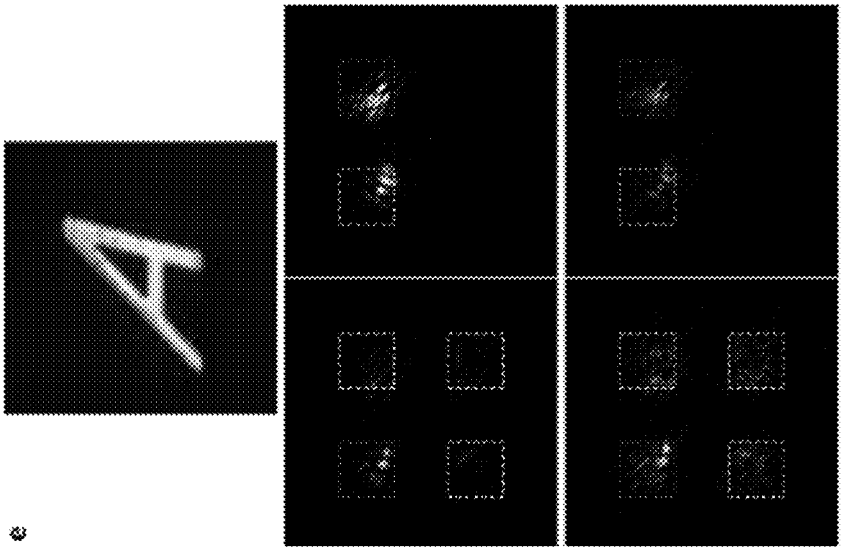
Figure 5I:
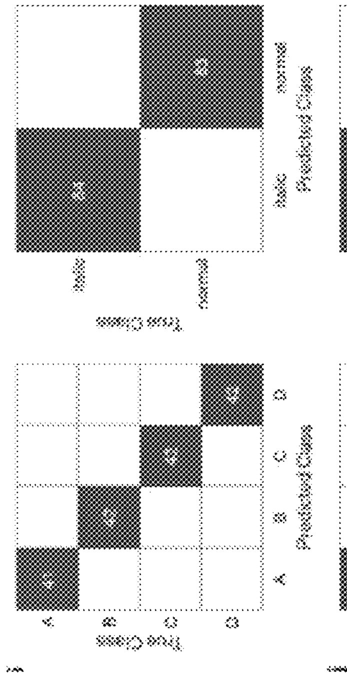
FIGS. 5I and 5J show confusion matrices summarizing the theoretical and real results of the recognition of 168 letters and their typographic styles, respectively.
Figure 5J:
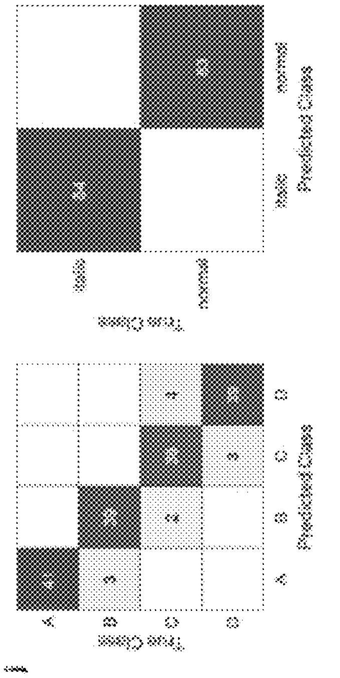
Figure 5G:
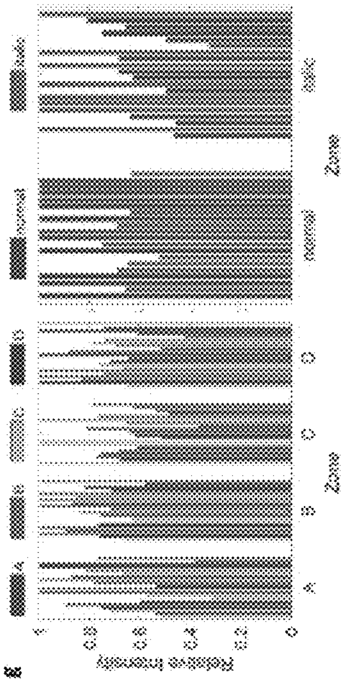
FIG. 5G shows computer-simulated integrated intensities of the detection zones for 20 randomly selected input letters, with the highest value normalized to 1.
Figure 5H:
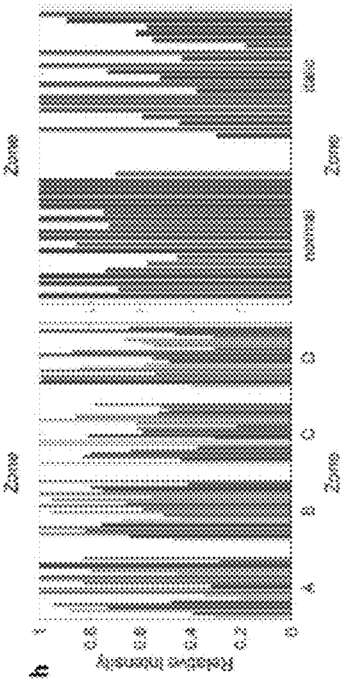
FIG. 5H shows experimentally measured integrated intensities of the detection zones for the same 20 letters as those shown in FIG. 5G.

FIGS. 5E-5F show two examples showing the recognition of an italicized "A" and a normal "C": (Top) Input images; (Middle) Measured intensity distributions on the output plane showing that the detection zone (red) corresponding to the identity (Left) and typographic style (Right) of a letter has the highest integrated optical intensity. (Bottom) Analytically calculated intensity distributions on the output plane show a high degree of consistency with the measured results. FIG. 5G shows the theoretically integrated intensities of the detection zones for 20 randomly selected input letters, with the highest value normalized to 1. The colors of the bars represent the true identities and typographic styles of letters. FIG. 5H shows the experimental integrated intensities of the detection zones for the same 20 letters as those shown in (g). FIGS. 51 and 5J show the confusion matrices summarizing the theoretical and experimental results of the recognition of 168 letters and their typographic styles, respectively.

Figure 6B:
FIG. 6B shows example human face images used in training and testing the doublet smart glass.
Figure 6A:
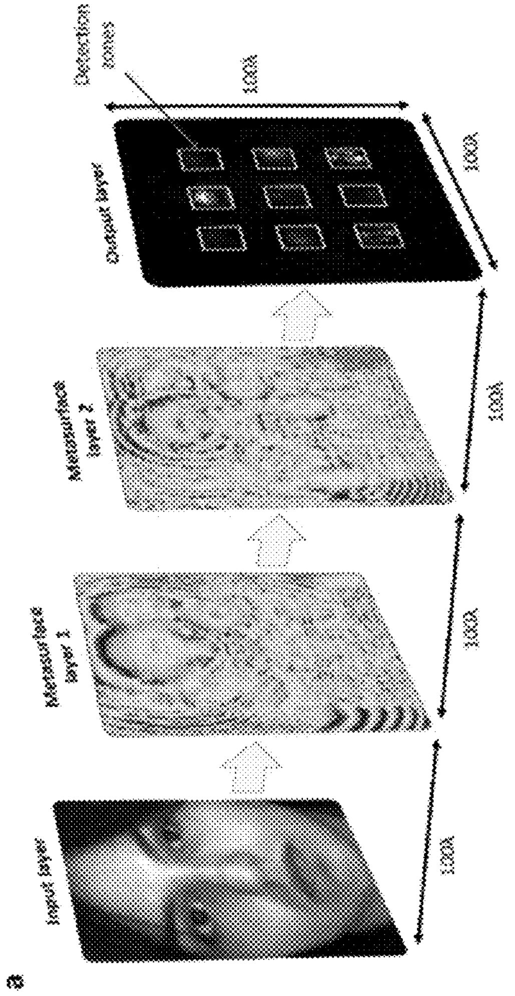
FIG. 6A provides a schematic diagram illustrating the working mechanism of the metasurface doublet for facial verification based on grayscale photos.
Figure 6C:
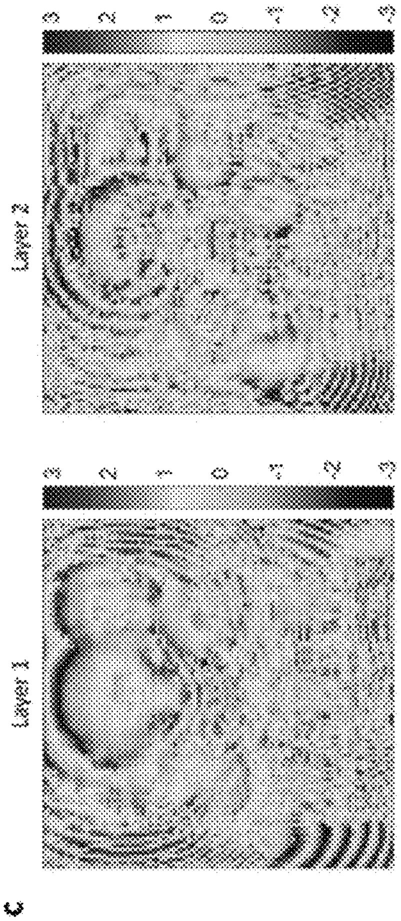
FIG. 6C shows the trained phase modulations of the metasurface doublet.
Figure 6D:
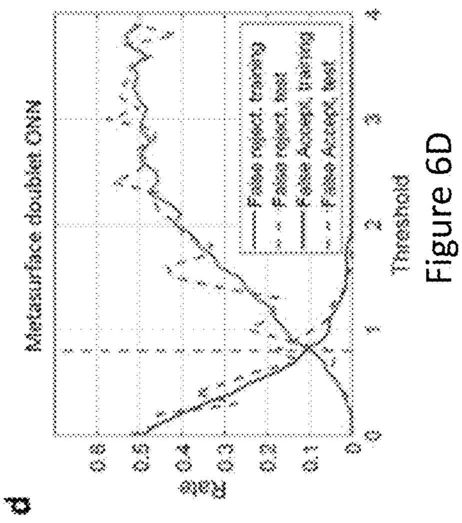
FIGS. 6D and 6E show the evolution of false accept/reject rate (orange/blue curves) as a function of the threshold Euclidean distance of the disclosed metasurface doublet ONN and a control digital ANN, respectively.
Figure 6E:
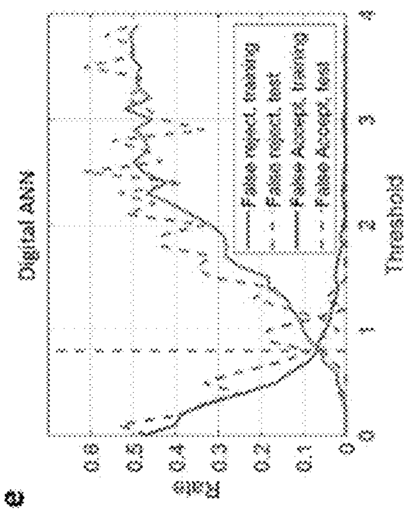
Figure 6G:
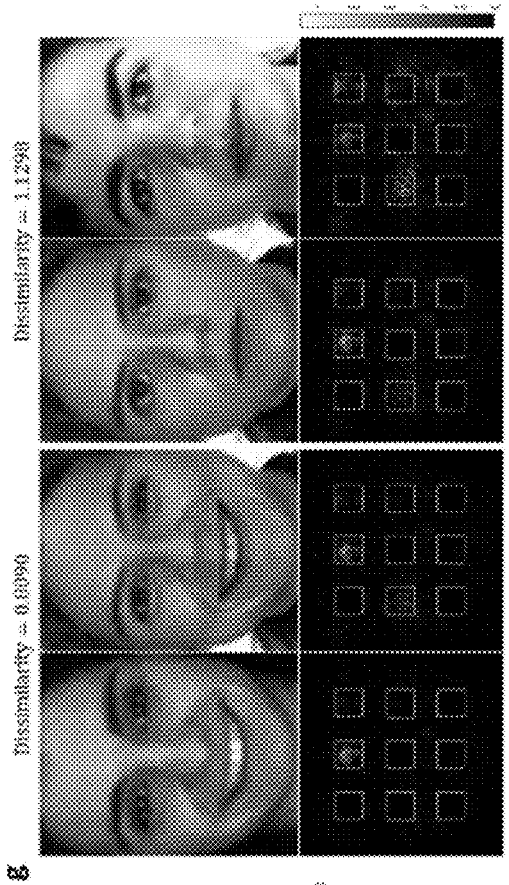
FIG. 6G shows examples showing that a pair of photos are determined to represent distinct persons with their Euclidean distance determined by the metasurface doublet above a threshold of ~0.8.
Figure 6F:
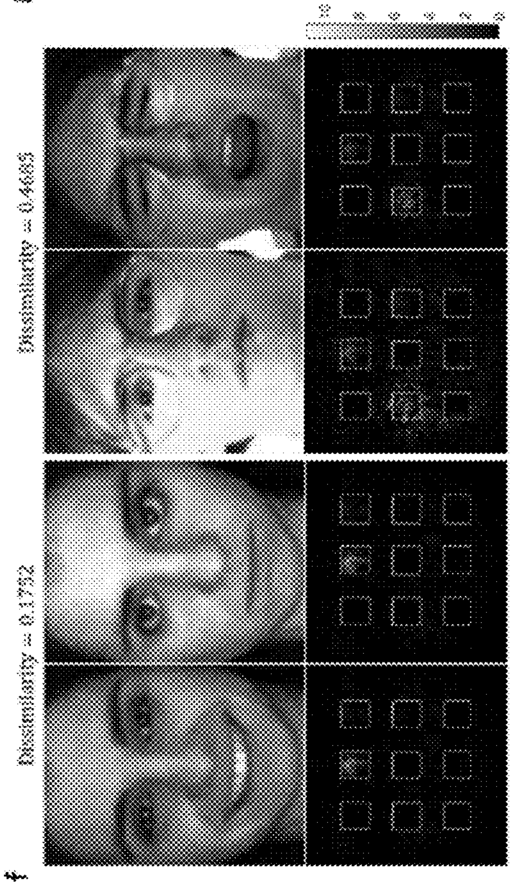
FIG. 6F shows examples showing that a pair of photos are determined to represent the same person with their Euclidean distance determined by the metasurface doublet below a threshold of ~0.8.

Facial verification using double-layered metasurface smart glass: Complex recognition tasks beyond digit or letter classification require metasurfaces with enhanced expressive power. A theoretical ONN consisting of a metasurface doublet was represented for human facial verification (FIG. 6*a*): the ONN can translate an optically coherent, gray-scale image into a low-dimensional representation, allowing one to compare two distinct images of human faces and decide whether the images represent the same person. Specifically, the metasurface doublet maps an image into a 3×3 intensity array on the detection plane, and the similarity between two images is evaluated by calculating the Euclidean distance, or dissimilarity, between the two resulting intensity arrays: if the Euclidean distance is below a threshold, the two images are considered a match (FIG. 6*f*); if the distance is above the threshold, the two images are considered to represent distinct persons (FIG. 6*g*).

A dataset consisting of photos of 100 people, each person with 14 distinct photos (some examples shown in FIG. 6*b*), was used for training and testing the ONN: the photos of 90 people are used to train the metasurface doublet, and the photos of the remaining 10 people are used in the test. The result shows that when the threshold Euclidean distance is appropriately chosen (e.g., 0.8 in this example), the rate of false acceptance (i.e., percentage of impostor pairs accepted) and the rate of false rejection (i.e., percentage of genuine pairs rejected) are both approximately 10% (FIG. 6*d*), resulting in a verification accuracy of approximately 80%, which is comparable to that achieved by a digital ANN with three convolutional layers (FIG. 6*e*).

FIG. 6 shows the metasurface doublet for human facial verification. FIG. 6A shows a schematic illustrating the working mechanism of the metasurface doublet. The metasurface device converts a human face image into a 3×3 optical "barcode" according to the amount of optical power that falls onto the 9 detection zones on the output plane, and whether two images represent the same person is determined by evaluating the difference between their "barcodes." FIG. 6B shows example human face images used in training and testing the doublet smart glass. FIG. 6C shows the trained phase modulations of the metasurface doublet. FIGS. 6D and 6E show results showing the evolution of false accept/reject rate (orange/blue curves) as a function of the threshold Euclidean distance of the disclosed metasurface doublet ONN and control digital ANN, respectively. FIG. 6F shows two examples showing that a pair of photos are determined to represent the same person (despite differences in facial expressions and photo exposure levels) with their Euclidean distance determined by the metasurface doublet below a threshold of ~0.8. FIG. 6G shows two examples showing that a pair of photos are determined to represent distinct persons (despite similar facial expressions) because their Euclidean distance is above the threshold.

Robustness of metasurface ONN: In the simulation, an ONN consisting of a single metasurface is usually sufficient to provide a high accuracy of >90% for simple tasks such as a digit or letter recognition. However, experiments can report a lower accuracy by a few percent to 20%. This discrepancy is related to the robustness of metasurface smart glasses against experimental errors, and the intensity contrast between the detection zones with the highest and second highest intensities can quantify the robustness of the ONN design. The disclosed experiments show that this inter-zone contrast positively correlates with the degree of agreement between theoretical and experimental recognition accuracies. Thus, by considering this inter-zone contrast in the loss function or by increasing its weight in the loss function while training the ONN, the impact of experimental errors on the performance of the ONNs can be mitigated.

The increasing expressive power of metasurface ONN: Results in FIGS. 2-5 indicate that a single metasurface can recognize 4-10 classes of relatively simple optically coherent objects. However, it is a daunting task to create a neural network, even a digital one, to categorize a substantial portion of the images from the ImageNet database, which contains over 15 million high-resolution images prelabeled in over 22,000 categories. In addition, compared to optically coherent objects, optically incoherent ones are more prevalent in everyday life but represent a bigger challenge for an optical neural network. This is because the cross-product between field components as a result of optical interference provides a form of nonlinear activation in the disclosed ONN, and thus, the expressive power of the ONN can be reduced in the absence of optical interference when scattered light waves from objects become incoherent.

A general approach to boost the expressive power of the metasurface smart glass is to increase the "width" and "depth" of the ONN. This is a close parallel with the progress in digital ANNs, where networks with increased width and depth are developed to solve more complex problems. The ONN depth can be increased by using a multi-layered metasurface architecture; the metasurface doublet has enabled the recognition of gray-scale images of human faces, which are considerably more complex than binary digits and letters.

The ONN width can be increased by employing a few strategies. First, a straightforward method to double the expressive power of a metasurface is to leverage polarization multiplexing. Second, metasurfaces providing complete and independent control of optical phase and amplitude can be more powerful building blocks of an ONN compared to phase-only metasurfaces used in the disclosed subject matter. In the phase-amplitude metasurface holograms, the optical amplitude can be controlled by the degree of structural birefringence of meta-units, while the optical phase is controlled by the in-plane orientation of the birefringent meta-units. Another approach to realize simultaneous amplitude and phase control is to use monolithic bilayered meta-units, where silicon and $TiO_2$ can provide amplitude attenuation and phase retardation for visible light, respectively.

Third, wavelength-multiplexing can introduce an additional dimension to increase the expressive power of an ONN. The optical dispersion of meta-units (i.e., their phase and amplitude responses as a function of wavelength) can be engineered by controlling the size and shape of the meta-unit cross-sections. As a result, a single metasurface can encode distinct optical amplitude-phase profiles at different wavelengths. Lastly, including an array of distinct metasurfaces in each layer of the neural network is an effective approach to increasing its expressive power. The disclosed subject matter indicates that a single layer of 10 distinct metasurfaces is able to classify 10 classes of incoherent objects (i.e., MNIST hand-written digits) with an accuracy higher than 90%.

ONNs based on optical metasurfaces can recognize binary and gray-scale images with high accuracy. Although the disclosed ONNs do not feature a great depth, their expressive power is substantially augmented by the width of each layer due to the millions of subwavelength meta-units in each metasurface. The intrinsic 2D nature and diffraction-based signal processing of the ONN are suitable for applications in object recognition and other image-based computer vision tasks. The width and depth of the ONN can be scaled up to recognize a large number of classes of monochrome and colorful objects illuminated by either coherent or incoherent light. This can be achieved, for example, by using phase-amplitude metasurfaces, implementing polarization and wavelength multiplexing in each metasurface, using arrays of metasurfaces on each layer of the network, and cascading metasurface layers. Aside from leveraging optical interference to introduce a form of nonlinear activation, the disclosed ONNs do not utilize the nonlinear activation function in the strict sense as it is implemented in biological and digital neural networks. This fact limits the range of tasks that they can perform and the accuracy that they can achieve. Additional work can realize nonlinear activation by introducing nonlinear materials (e.g., semiconductors with saturable absorption) into metasurfaces.

Advanced sensors can be ubiquitous in various applications. These sensors are often deployed in areas or scenarios that lack infrastructure support. They require minimal service and feature resilience to interference, high energy efficiency, and information security. These requirements present a daunting challenge for existing technology. An ONN, such as the ones demonstrated in this work, computes directly upon the physical domain, effectively condensing measurement, analog-to-digital conversion, and computing in a single passive device. It uses no power, provides physics-guaranteed security, and has an ultra-compact form factor. Importantly, it can protect the privacy of the subject of interest because there is no representation of the subject in the digital domain. With these advantageous traits, ONNs as "edge" perception devices can fundamentally reshape data collection and analysis.

Example 2: Metasurface Smart Glass for Object Recognition

Current AI-powered object recognition solutions are a high-quality imitation of the human vision and perception systems (FIGS. 7(*a*) and 7(*b*)); however, they inherit fundamental limitations of the biological systems and introduce new problems. Take a digital ANN for human facial identification as an example. It consists of a compound optical system like the human eye to form facial images, an optoelectronic sensor array to mimic the retina, and a digital processor functioning like the disclosed visual cortex to conduct neural computing. The resulting system is bulky, extremely energy-consuming, slow due to the latency between technology modules, and vulnerable to cyber-attack. Importantly, like what happens in the human eye, when 3D objects are mapped into 2D images, rich information contents are lost. These contents, including optical phase, spectrum, and polarization, are carried by optical waves that can aid the identification task.

The disclosed optical neural network or ONN (FIG. 7(*c*)) works by directly harvesting light waves from targets without information loss, processing the waves by using their internal photonic structures, and generating optical readout ("optical barcodes"). The "barcodes" thus become simplified, characteristic representations of the targets for the identification task.

The disclosed ONNs are based on metasurfaces, which are composed of a 2D array of meta-units and can offer complete and precise manipulation of optical amplitude, phase, and polarization across the wavefront with subwavelength resolution. The excitatory and inhibitory connections in the visual cortex are emulated by constructive and destructive interference of light waves as they propagate through the ONN. The collective operation of millions of meta-units with subwavelength dimensions enables efficient parallel computing with a high expressive power; as such, tasks traditionally only solvable by using a complex multilayered digital neural network can be accomplished by the disclosed ONN by using just a single metasurface or a few cascaded metasurfaces.

Figure 7A:
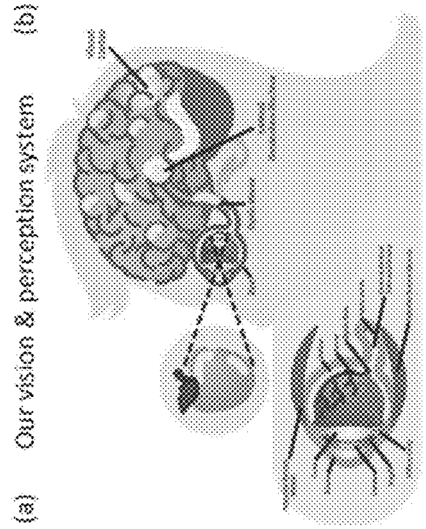
FIG. 7A provides a diagram showing the biological vision and perception process.
Figure 7B:
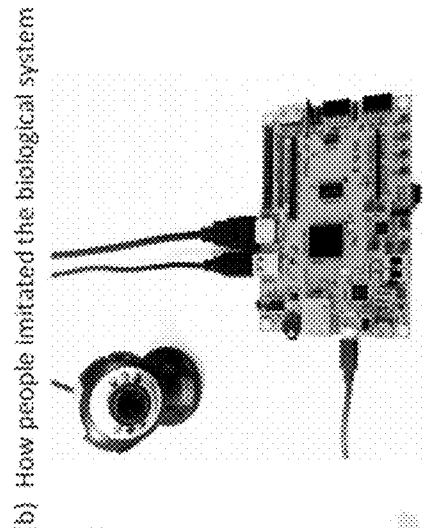
FIG. 7B shows that certain recognition solutions based on digital ANNs are an imitation of the human vision and perception system, inheriting several fundamental limitations of the biological system, including system complexity and bulkiness and information loss due to signal transduction from the physical to the digital domain.
Figure 7C:
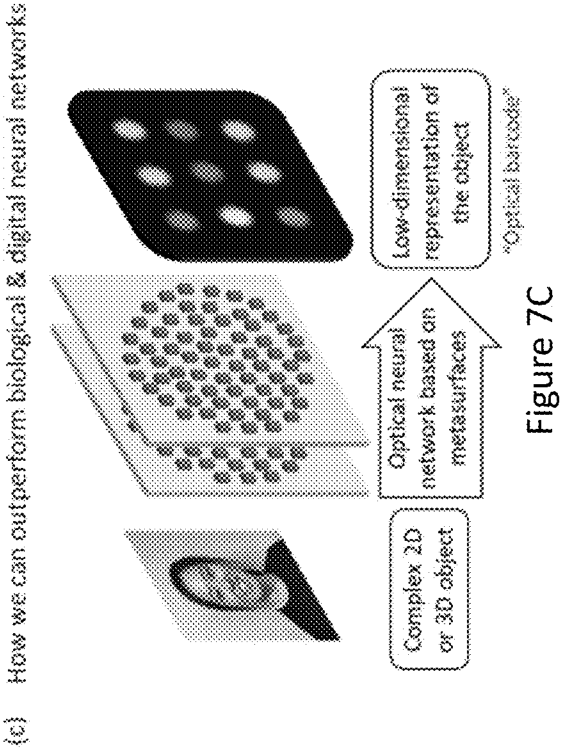
FIG. 7C shows example ONNs in accordance with the disclosed subject matter.

FIGS. 7A and 7B show that certain object recognition solutions based on digital ANNs are an imitation of the human vision and perception system, inheriting several fundamental limitations of the biological system, including system complexity and bulkiness and information loss due to signal transduction from the physical to the digital domain. FIG. 7C shows that ONNs being developed in this project can surpass the biological and digital systems in compactness, energy efficiency, computing speed, and accuracy. In the particular example illustrated in (c), an optical wave from a 2D photo is processed by a metasurface doublet, which provides a desired modulation to the optical amplitude and phase over the wavefront. The modulated light wave further propagates in the forward direction and produces an optical diffraction pattern that lights up 3×3 predefined zones on the output plane. A set of 3×3 photodetectors integrate the optical power in each zone, generating a 3×3 barcode, which is a simplified, characteristic representation of the person in the photo: photos of the same person with different facial expressions and with or without partial facial coverage can generate similar barcodes; photos of different persons can generate distinct barcodes. In the more complex case of a 3D object, the initial optical wavefront can contain complex phase, amplitude, polarization, and spectral information of the object; metasurfaces can be trained to process these information contents. This is different from the approach based on digital ANNs, where the imaging process only preserves the intensity information and, to a limited degree, the spectral information (i.e., RGB channels), while the phase and polarization information is completely lost.

The disclosed ONNs can outperform digital ANNs in system compactness, energy efficiency, computing speed, accuracy, and data security:

(1) The ONN has an extremely small footprint, consisting of a thin slab of nanostructured material, a small number of photodetectors to read the "optical barcodes," and a simple analog circuit to compare the barcodes.

(2) Neuromorphic computing in the form of light scattering in the ONN does not consume power, and little power is needed for the photodetectors and the analog circuit.

(3) Signals propagate within the ONN at light speed, resulting in ultrafast computing (~1 billion target inferences per second).

(4) The ONN can process in parallel a comprehensive set of information (phase, amplitude, polarization, and wavelength) contained in the light waves from targets; therefore, analysis can be more thorough and accurate.

(5) Computation is conducted in the physical domain, avoiding the digital-domain representation of targets; therefore, the ONN is intrinsically robust against a security breach.

ONN design is an iterative process where each iteration consists a forward calculation and a backward calculation. During the forward calculation process, optically coherent or incoherent objects such as facial photos are fed into the diffractive network and propagation of light waves from target objects, through metasurfaces, to the detector plane is numerically computed by using the Rayleigh-Sommerfeld diffraction theory. A loss function is defined to evaluate the cross-entropy between the calculated intensity distribution over the detection plane and the target "optical barcodes." During the backward calculation process, the phase, amplitude, and/or polarization responses of the 2D array of meta-units comprising the metasurface layers are adjusted to minimize the loss function utilizing the "Adam" optimization algorithm adapted from the stochastic gradient-based optimization method. Several strategies are applied to increase the robustness of the trained ONN against experimental errors. For example, a certain degree of mispositioning and misorientation of the input object, metasurfaces, and detection plane, and a certain degree of variations of the distances between these components can be included in the training.

This novel approach to conduct neuromorphic computing based on optical wave propagation and scattering in engineered complex optical media has been validated in the disclosed preliminary experimental work on the recognition of handwritten digits and letters [1]. For example, the recognition of 4 classes of hand-written digits: {0, 1, 3, 4} from the MNIST dataset was shown (FIG. 8). The binary optical input was created with a near-infrared laser beam incident on a photomask. The smart glass is a single metasurface (FIG. 8(*c*)) composed of meta-units in the form of silicon nanopillars with various sizes and cross-sectional shapes (FIG. 8(*d*)). Each nanopillar has a footprint that is about half of the wavelength, and, depending on the size and shape, it can introduce a local phase delay to the optical wavefront so that the entire device can provide a phase modulation with subwavelength resolution over the optical wavefront. The output diffraction pattern is captured by a camera. The optical intensities in the detection zones (FIG. 8(*b*)) are extracted from the camera image, and the input object is categorized according to the zone receiving the highest integrated intensity (FIG. 8(*e*)). FIG. 8(*f*) shows the confusion matrix summarizing the recognition results. The recognition accuracy achieved in experiments is 98.3%, while the training reports a theoretical accuracy of 99.1%.

Figure 8A:
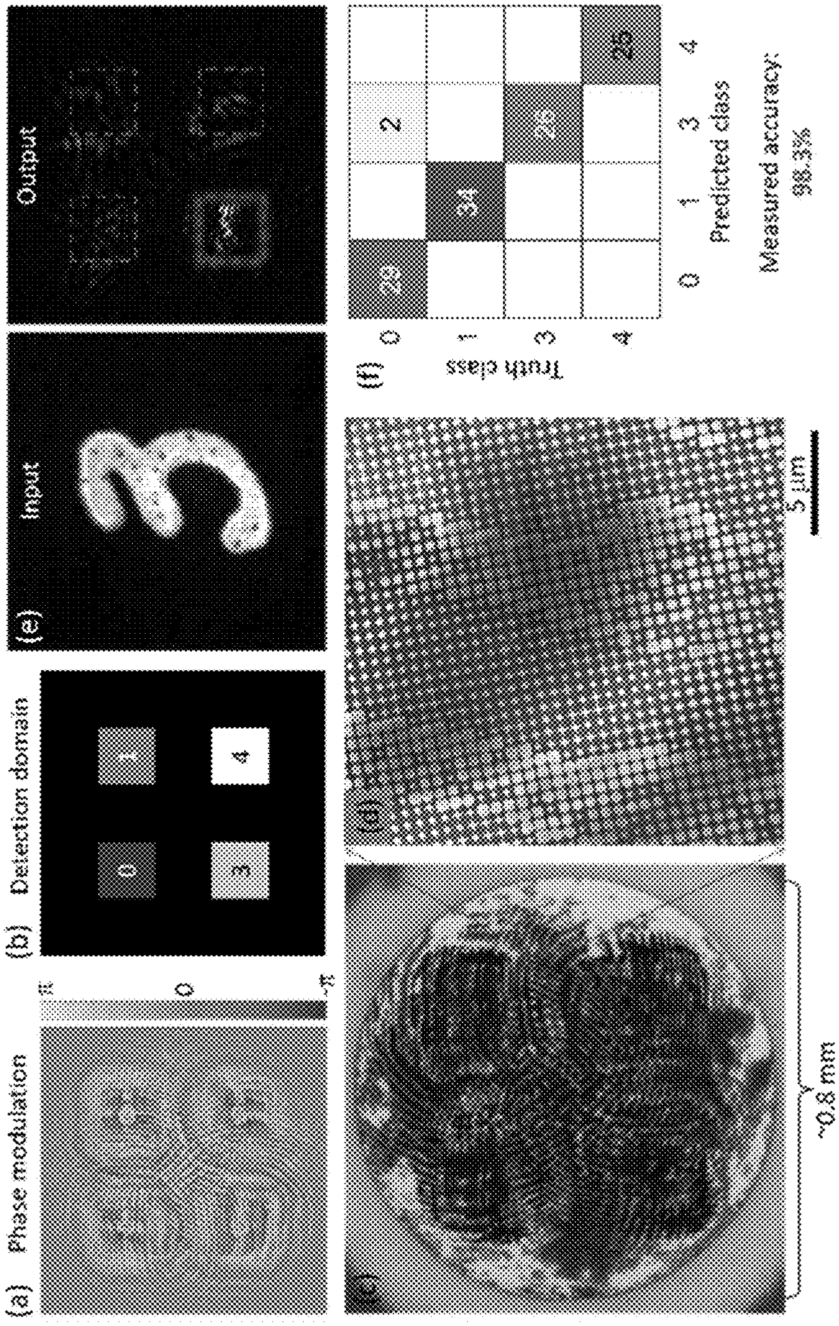
FIG. 8A shows the trained phase modulation of a metasurface for recognizing four classes of hand-written digits.

FIG. 8 shows results on metasurface ONN for recognizing 4 classes of handwritten digits. FIG. 8A shows the trained phase modulation of the metasurface. FIG. 8B shows the definition of detection zones on the output layer for recognizing 4 classes of handwritten digits {0, 1, 3, 4} in the MNIST database. FIG. 8C shows a photo of a fabricated metasurface device. FIG. 8D shows a scanning electron micrograph (SEM) of a portion of the device. FIG. 8E shows an example showing the recognition of the handwritten digit "3". Left: Input image. Right: Intensity distribution on the output plane showing that the zone corresponding to the classification label "3" (the one with glow) receives the highest integrated optical intensity. (f) Confusion matrix summarizing experimental results of recognizing handwritten "0", "1", "3," and "4" with an accuracy of 98.3%.

The capacity and accuracy of object recognition are proportional to the physical complexity or the "expressive power" of a neural network. An approach to double the expressive power of a metasurface is to leverage polarization multiplexing. By using meta-units with a non-unity aspect ratio of the cross-section, the optical response of a metasurface can be birefringent: it can respond differently and independently to light with orthogonal polarization states. FIG. 4 illustrates an example where horizontally polarized light was used for recognizing 5 of the 10 classes of handwritten digits, and used vertically polarized light to recognize the other 5 classes. The confusion matrices show that accuracies of 91.0% and 81.4% can be achieved for the two polarization states, respectively.

In the handwritten digit classification task, the ONN transforms an input digit into a diffraction pattern over an array of predefined zones, and the input is classified according to the zone receiving the highest integrated intensity. The results of testing many target digits can be summarized into a confusion matrix, the diagonal elements of which represent correct classification. The ratio of correct classification cases over the total number of classification cases is thus the overall classification accuracy.

Figure 9:
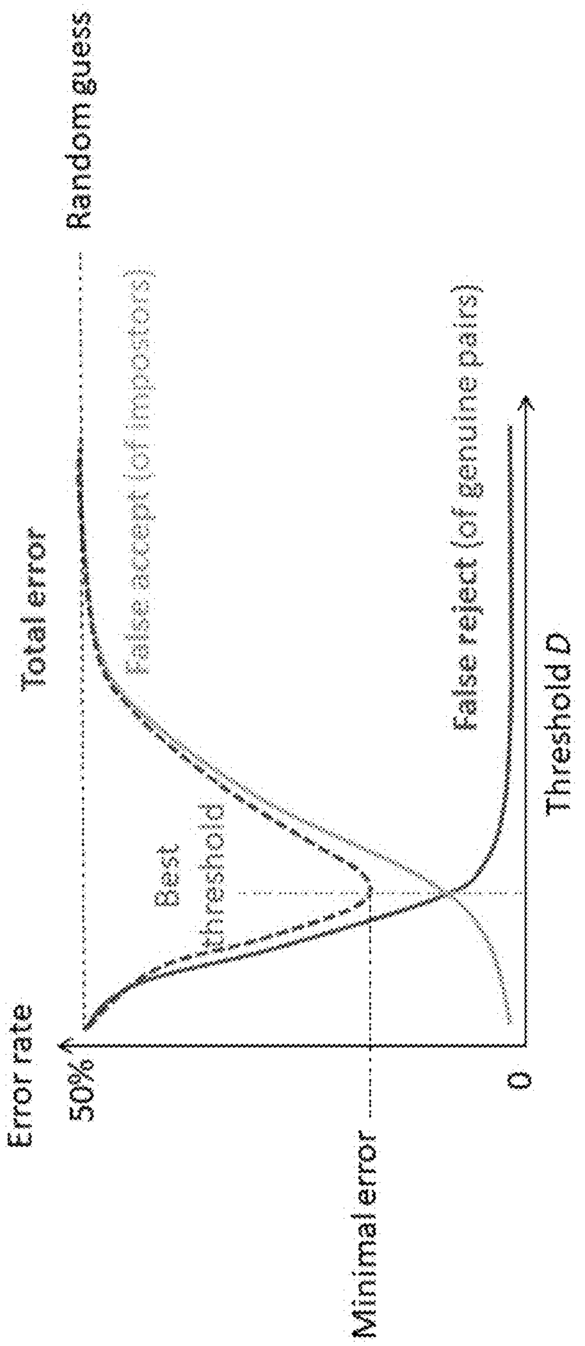
FIG. 9 provides a schematic of an error rate diagram, showing the false acceptance error rate (orange curve) and false rejection error rate (blue curve), as well as their sum, the total error rate, as a function of the chosen threshold Euclidean distance D.

In the human facial verification task, the ONN compares two distinct gray-scale images of human faces and verifies whether the images represent the same person. The ONN first transforms a facial image into a 3×3 array of optical spots or "barcode" (a much simplified, lower-dimensional representation of the image); whether a pair of images represent the same person is then determined by calculating the Euclidean distance (or dissimilarity, D) between the two optical "barcodes" corresponding to the pair of images. If the Euclidean distance is below threshold D, the two images are considered a match; if the distance is above the threshold, the two images are considered to represent distinct persons. Choosing an improperly large threshold D can lead to false acceptance of imposter photos as representing the same person while choosing it too small can lead to false rejection of genuine photos of the same person. Therefore, there is an optimal threshold D that minimizes the total error (FIG. 9). The accuracy in the facial verification task is defined as 100%— minimal total error.

FIG. 9 shows a schematic of an error rate diagram, showing the false acceptance error rate (orange curve) and false rejection error rate (blue curve), as well as their sum, the total error rate, as a function of the chosen threshold Euclidean distance D. An optimal threshold D at the intersection between the two types of error can minimize total error and maximize the accuracy in facial image verification.

Figure 10:
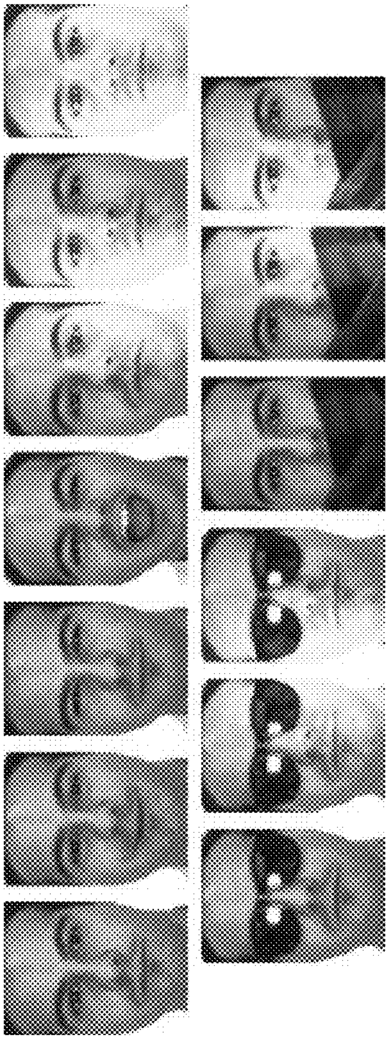
Figure 11A:
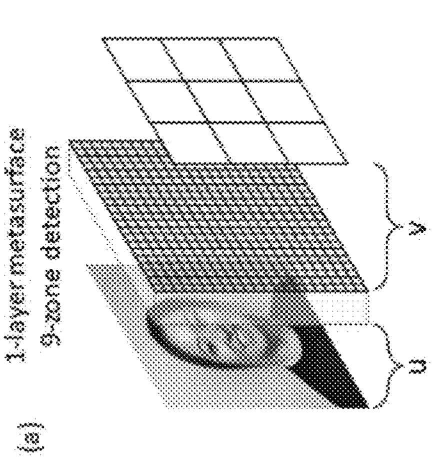
FIG. 11A shows a schematic of an ONN for facial verification based on grayscale photos and a single layer of metasurface.
Figure 11B:
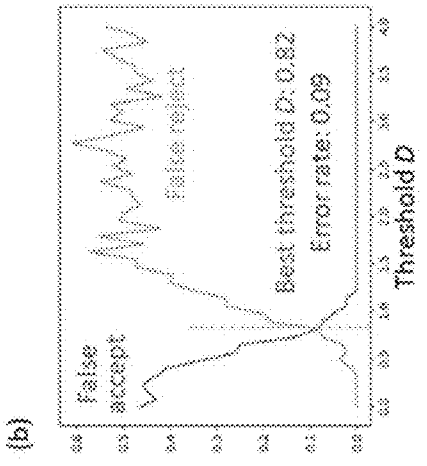
FIG. 11B shows an error rate diagram showing that at the optimal threshold Euclidean distance (i.e., dissimilarity) of 0.82, a minimal total error rate of 18% (consisting of 9% false rejection and 9% false acceptance) or a maximum verification accuracy of 82% is achieved.
Figure 11C:
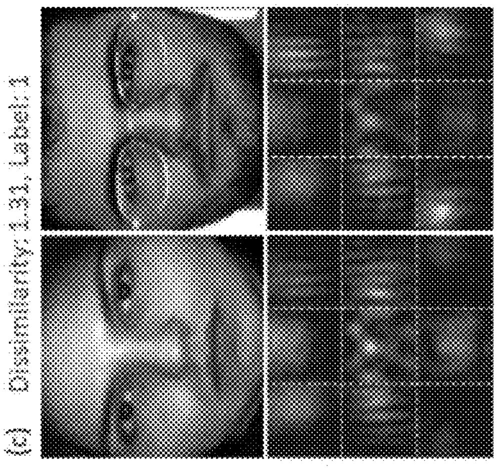
FIGS. 11C and 11D show examples to illustrate the verification process. Specifically, the two photos in FIG. 11C belong to two distinct persons and the optical barcodes (the diffraction patterns produced by the ONN dividied into 9 zones) are very different, whereas the two photos in FIG. 11D belong to the same person and the optical barcodes produced by the ONN are very similar (despite the fact that the photos show distinct facial expressions and have different brightness levels).
Figure 11D:
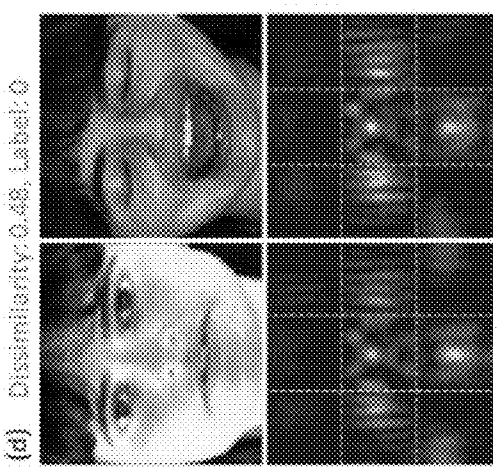
Figure 12A:
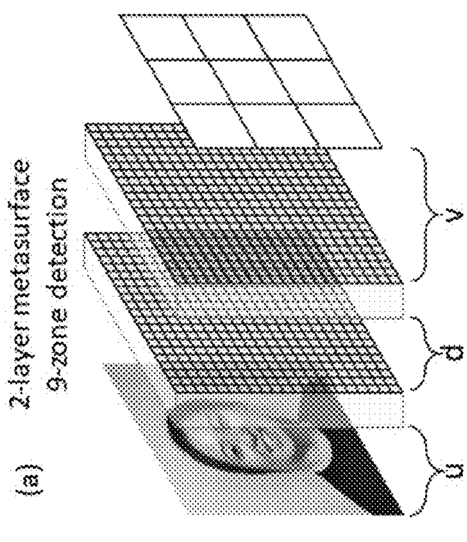
FIG. 12A provides a schematic of an ONN for facial verification based on grayscale photos and two metasurfaces.
Figure 12B:
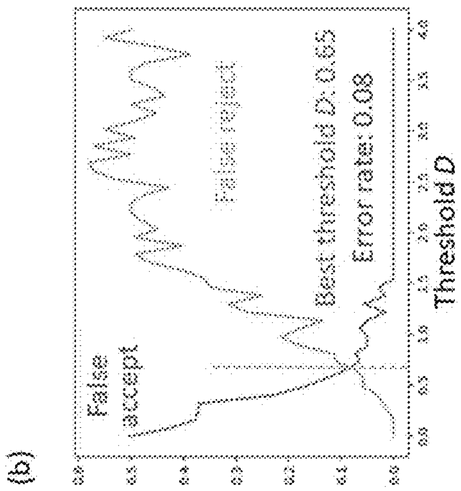
FIG. 12B shows an error rate diagram showing that at the optimal threshold Euclidean distance (i.e., dissimilarity) of 0.65, a minimal total error rate of 16% (consisting of 8% false rejection and 8% false acceptance) or a maximum verification accuracy of 84% is achieved.
Figure 12C:
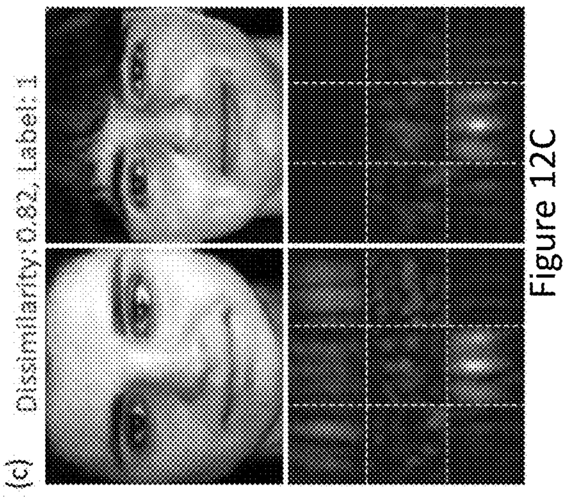
FIGS. 12C and 12D show examples of correct facial verification (distinct barcodes for two photos belonging to two different persons in FIG. 12C and similar barcodes for two photos belonging to the same person).
Figure 12D:

ONN for Human Facial Image Verification: a dataset consisting of photos of 100 people, each person with 26 distinct photos, was used (FIG. 10). The data of 90 people $((90\times26)^2$ pairs of photos) were used to train the metasurface ONNs and the rest belonging to 10 people ($260^2$ pairs of photos) were used in the test. The design parameters of the ONN were assessed, and the following is a list of certain results in accordance with the disclosed subject matter:

(1) ONNs consisting of one metasurface and those consisting of a metasurface doublet (two parallel metasurfaces separated by a distance) can both reach high verification accuracies of ~90% if designed properly. This performance is comparable to that achieved by a digital ANN consisting of three fully connected convolutional layers.

(2) Metasurface doublet designs are more robust against experimental variations (e.g., wavelength shift) compared to one-layer metasurface designs.

(3) The optical barcode has an optimal size. In the case of a one-layer metasurface ONN, the highest verification accuracy is achieved when the optical barcode has a size of 8×8 (i.e., 64 photodetectors on the output plane); smaller or larger barcodes reduce (though not significantly) the verification accuracy.

(4) When the loss function is designed not only to penalize verification errors but also to concentrate optical intensity into isolated, pre-defined zones on the output plane (for the ease of detection by discrete photodetectors), there is a compromise between verification accuracies and the degree of optical concentration.

(5) Partial facial coverage decreases verification accuracies.

FIG. 10 shows example facial photos used to train and test the disclosed ONNs. These 13 photos represent the same individual with the following conditions: 1. Neutral expression, 2. Smile, 3. Anger, 4. Scream, 5. Left light on, 6. Right light on, 7. All sides light on, 8. Wearing sunglasses, 9. Wearing sunglasses and left light on, 10. Wearing sunglasses and the right light on, 11. Wearing a scarf, 12. Wearing a scarf and left light on, 13. Wearing a scarf and right light on, 14-26. Second session (similar conditions as 1 to 13).

In the following, quantitative data is presented to substantiate the above main results. Verification accuracies are not affected by the separation distances (between initial photos and metasurfaces, between metasurface layers, and between metasurfaces and output layers), the relative size between input photos and metasurfaces (as long as metasurfaces are not substantially smaller than the photos), and the thickness of the carrier substrate for the metasurfaces.

Properly designed one-layer metasurface ONN and metasurface doublet ONN can both achieve high verification accuracies: FIG. 11 shows the design and performance of a one-layer metasurface ONN. Coherent light emission from the input photo passes through a single metasurface (in fact, first through a glass substrate and then through a thin metasurface layer patterned on the substrate; FIG. 11(*a*)), which provides phase modulation over the wavefront; the modulated wave further propagates to the output plane, which is divided into 3×3 closely packed zones (without spacings between adjacent zones). An optical barcode consisting of 3×3 numbers is produced by integrating the optical intensity in each of the 9 zones.

FIG. 11 Design and performance of an ONN with one metasurface and 9 closely packed detection zones. FIG. 11A shows a schematic of the ONN. Detailed design parameters are: u=9677λ, metasurface carrier substrate thickness=323λ (500 μm when λ=1.55 μm), v=10000λ, meta-unit sizes: 0.5λ×0.5λ, overall metasurface sizes: 500λ×500λ, and input photo sizes: 500λ×500λ. Designs with other values of u and v (as small as 1000λ) and other metasurface input photo sizes (e.g., 5000λ×5000λ) were also tried, yielding similar accuracies as that in (b). FIG. 11B shows an error rate diagram showing that at the optimal threshold Euclidean distance (i.e., dissimilarity) of 0.82, a minimal total error rate of 18% (consisting of 9% false rejection and 9% false acceptance) or a maximum verification accuracy of 82% is achieved. FIGS. 11C and 11D show two examples to illustrate the verification process. The pair of photos in (c) produce distinct optical scattering patterns and, after division into 9 zones and integration, distinct barcodes; the calculated Euclidean distance of 1.31 between the barcodes is thus well above the optimal threshold D of 0.82, determined in (b) ("Dissimilarity: 1.31" in red is to indicate that the calculated D is larger than the optimal threshold D). Therefore, the ONN tells us that the two photos are "imposters," which agrees with the ground-truth label of the pair of photos: "Label: 1" ("1" and red color both stand for "imposters"). The pair of photos in (d) represents a nontrivial case: despite the fact that the two photos have a large difference in overall brightness and show completely different facial expressions, the ground-truth label "Label: 0" indicates that they belong to the same individual ("0" and blue color both stand for "genuine pair"). the disclosed one-layer metasurface ONN works perfectly in this difficult case: the two optical scattering patterns in (d) are essentially identical, and the calculated dissimilarity of 0.48 is well below the optimal threshold D of 0.82 ("Dissimilarity: 0.48" in blue is to indicate that the calculated D is smaller than the optimal threshold D). Therefore, the ONN makes the correct verification that the two photos are a "genuine pair."

The training process optimizes the 2D phase distribution of the metasurface to (a) maximize the Euclidean distance between barcodes of photos belonging to distinct persons and (b) minimize the Euclidean distance between barcodes of photos belonging to the same individual. If each barcode can be visualized as one point in the 9-dimension Euclidean space, the training process arranges points representing photos of the same person into a cluster and pushes the center of mass of distinct clusters away from each other. The number of photos that can be encoded by a small 3×3 optical barcode is huge. For example, assume that each of the 9 photodetectors has only 4-bit analog-to-digital conversion or 16 distinct output values; the total number of unique barcodes is $16^9$=68,719,476,736.

Mathematically, the barcodes are calculated via $$\vec{p} = \frac{3\times 3 \text{ photodetector readouts}}{\max(\text{photodetector readouts})}, \tag{1}$$

The Euclidean distance between two barcodes $\vec{p}$ and $\vec{q}$ is defined as $$D(\vec{p}, \vec{q}) = \sqrt{\sum_{i=1}^{9} (p_i - q_i)^2}, \tag{2}$$

and the loss function used to optimize the metasurface design has the following design:

$$\text{Loss function} = (1 - Y)D^2 + Y[\max(0, m - D)]^2. \tag{3}$$

During the supervised training process, if a pair of photos belong to the same person ("genuine pair"), then Y=0; otherwise, if they are not matched ("imposters"), then Y=1. In the above loss function, m is called "margin" and typically takes a value between 2 and 3. The function of m is the following: the ONN optimization process cannot benefit too much from "trivial" cases where the Euclidean distance D between two photos is very large; if D is larger than a threshold, set by m, the loss function defined in the above equation can become zero (instead of Loss function=$(m-D)^2$).

The disclosed one-layer metasurface ONN shows a satisfactory performance. During the test session where the ONN was used to verify pairs of photos, it was found that when the threshold Euclidean distance D was chosen to be 0.82, this simple optical system based on only a single metasurface layer had a small false acceptance rate of 9%, a small false rejection rate of 9% (FIG. 11(*b*)), and thus an overall verification accuracy of 82%. The test included some difficult pairs of photos, such as the one shown in FIG. 11(*d*), where the photo exposure levels and the facial expressions are drastically different (i.e., open and closed eyes and mouth); yet, the disclosed ONN can successfully determine that they belong to the same person.

FIG. 12 shows the design and performance of an ONN based on a metasurface doublet. The training process utilizes the same loss function as above, the only differences being that light emission from the input facial photo is scattered in sequence by two distinct metasurfaces and that their 2D phase distributions are optimized together to minimize the loss function. The disclosed test results show that when the threshold Euclidean distance D was chosen to be 0.65, the ONN had a small false acceptance rate of 8%, a small false rejection rate of 8% (FIG. 12(*b*)), and thus an overall verification accuracy of 84%. This ONN based on a metasurface doublet is equally capable of verifying difficult "genuine" photo pairs such as the one shown in FIG. 12(*d*), which has completely different photo exposure levels and facial expressions, and verifying "imposters" such as the pair shown in FIG. 12(*c*), which has similar photo exposure levels and facial expressions. FIGS. 11 and 12 together show that properly designed ONNs with one or two metasurface layers are able to achieve high facial image verification accuracies of ~80-85%.

FIG. 12 shows the design and performance of an ONN with a metasurface doublet and 9 closely packed detection zones. FIG. 12A shows a schematic of the ONN. Detailed design parameters are: u=d=9677λ, thickness of metasurface substrates=323λ, (500 μm when λ=1.55 v=10000λ, meta-unit sizes: 0.5λ×0.5λ, overall metasurface sizes: 500λ×500λ, and input photo sizes: 500λ×500λ. FIG. 12B shows an error rate diagram showing that at the optimal threshold Euclidean distance (i.e., dissimilarity) of 0.65, a minimal total error rate of 16% (consisting of 8% false rejection and 8% false acceptance) or a maximum verification accuracy of 84% is achieved. FIGS. 12C-12D show two examples of correct facial verification. The "imposter" pair in (c) ("Label: 1") shows a dissimilarity of 0.82, which is larger than the optimal threshold D=0.65; the difficult "genuine" pair in (d) ("Label: 0") with distinct overall brightness and facial expressions produces a dissimilarity of 0.51, which is smaller than the optimal threshold D.

Metasurface doublet designs are more robust against experimental errors compared to one-layer metasurface designs: Although the one-layer and the doublet ONN designs show comparable verification accuracies, their error rate diagrams suggest that the doublet design can be more tolerant of experimental variations. For example, a comparison of the error rate diagrams of the two cases (FIGS. 13A-13B) suggests that the performance of the doublet design is less susceptible to the precise choice of the threshold Euclidean distance D.

Figure 13A:
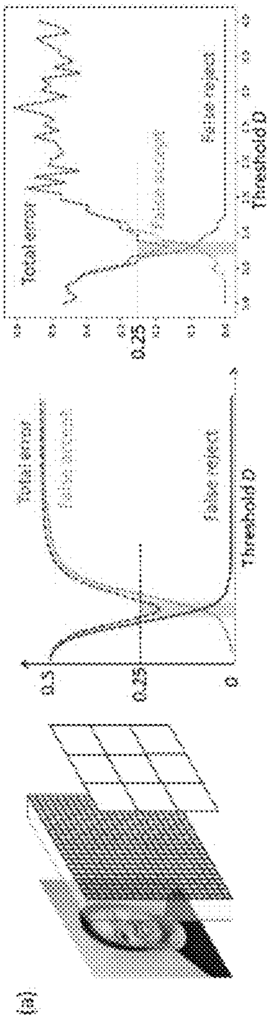
FIGS. 13A-13B provide graphs and diagrams showing the comparison between ONNs based on one and two metasurfaces.
Figure 13B:
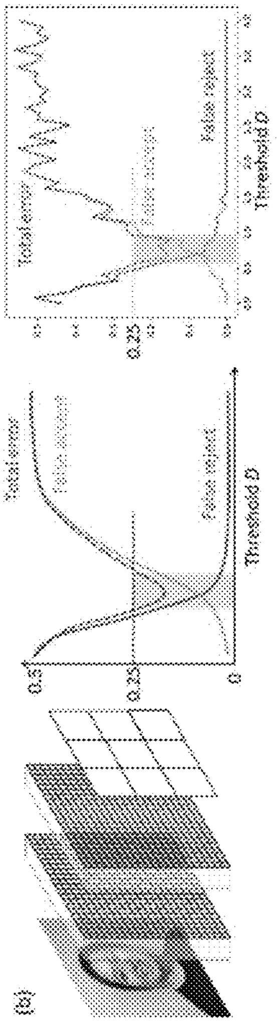

FIGS. 13A-13B shows the comparison between ONNs based on one and two metasurfaces. To achieve an accuracy of >75% (or a total error rate of <25%), the range of threshold D is twice as broad for the ONN based on a metasurface doublet compared to the ONN based on a single metasurface.

Figure 14:
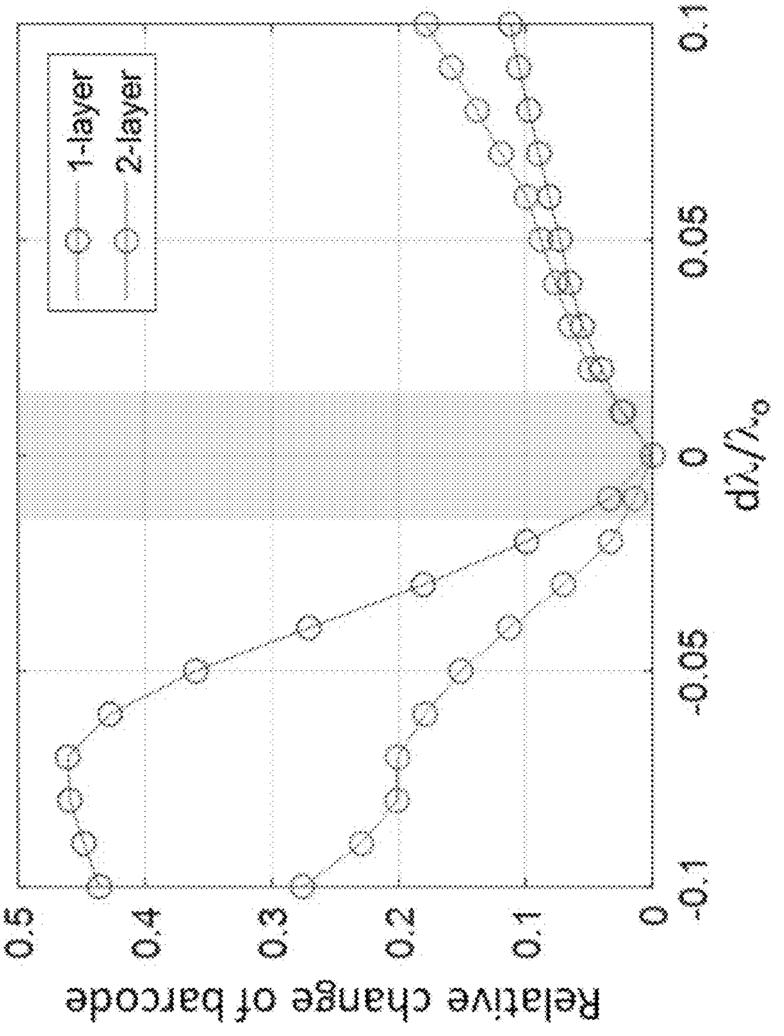
FIG. 14 provides a graph showing the relative change of generated barcodes as a function of variation of the illumination wavelength.

Furthermore, FIG. 14 shows that the doublet design is also more robust against the variation of the illumination wavelength. For example, when the wavelength varies around the central wavelength of $\lambda_o$=1.55 μm by ±5% (i.e., $d\lambda/\lambda_o$=±5%), FIG. 14 suggests that the change to the barcode generated by the doublet design can be <15%, whereas the change to the barcode generated by the single-metasurface design can be ~35%. One important implication of this analysis is that when the single-wavelength laser source is replaced with a near-infrared LED, facial verification work very well: typical near-infrared LEDs have a linewidth of dλ=20-30 nm, which is only ±0.6-1% of the central wavelength of $\lambda_o$=1.55 μm (yellow shaded zone in FIG. 14) and can cause insignificant changes to the generated barcodes for both the one-layer and the doublet ONN designs.

FIG. 14 shows the relative change of generated barcodes as a function of variation of the illumination wavelength. The yellow shaded zone indicates the linewidth of typical near-infrared LEDs. This calculation suggests that, while the doublet ONN design is more robust against wavelength variation (i.e., smaller changes to the barcode as a function of wavelength), both the one-layer and the doublet ONN designs work well when an LED, instead of a laser, is used as the source of illumination.

The optical barcode has an optimal size: It is not true that a larger barcode can necessarily translate into a higher accuracy. To use an analogy, during the facial recognition process in the disclosed brain, a facial image is distilled, digested, and transformed so that the essence of the face is preserved in a limited number of neurons and their interconnections in the visual cortex, instead of being stored in the disclosed brain pixel-wise, utilizing a lot of memory. Therefore, the barcode does not need to be too high to reach optimal performance. The relationship between verification accuracies and optical barcode sizes was investigated.

Figures 15A, 15B, 15C, 15D:
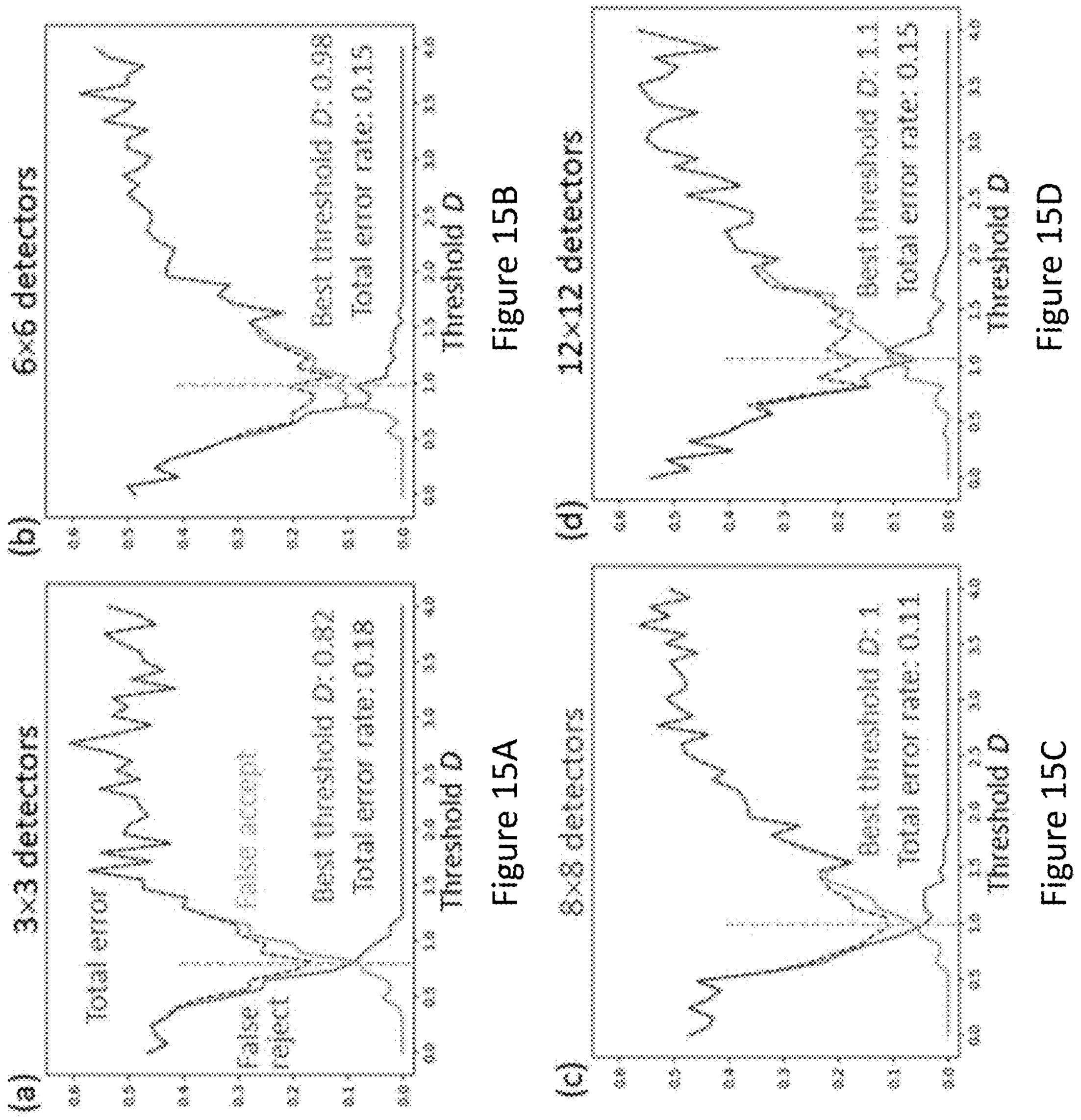
FIGS. 15A-15D provide graphs showing error rate diagrams as a function of the barcode size (the number of detection zones on the output plane) for ONNs based on a single layer of the metasurface.

FIG. 15 summarizes the results. Here, all other system parameters were unchanged and obtained the error rate diagrams of a one-layer ONN as a function of the barcode size. A barcode size of 3×3 enabled the one-layer ONN to reach a minimum total error rate of 18% (FIG. 12(*b*), repeated here as FIG. 15(*a*)). When the barcode size was increased to 6×6 and 8×8, the error rate steadily decreased to 15% and 11% (FIGS. 15(*b*) and 15(*c*)); however, when the barcode size was further increased to 12×12, the error rate bounced back to 15% (FIG. 15(*d*)). Therefore, at least for this one-layer ONN, the optimal barcode size is 8×8. FIG. 15(*c*) further shows that the minimal error rate and a high level of system robustness (i.e., a broad valley of the red curve) are achieved simultaneously. A few facial verification examples for the one-layer ONNs are shown in FIG. 16.

A similar assessment of ONNs was conducted based on metasurface doublets. The optimal barcode size was 6×6, where the smallest total error of 10% was achieved (FIGS. 17A-17C).

FIG. 15 shows the error rate diagrams as a function of the barcode size for ONNs based on a single layer of the metasurface. A minimal total error rate of 11% or verification accuracy of 89% is achieved at a barcode size of 8×8. An ONN with 8×8 detection zones also exhibits a high level of robustness against experimental errors (manifested by the broad valley of the red curve in (c)).

Figure 16:
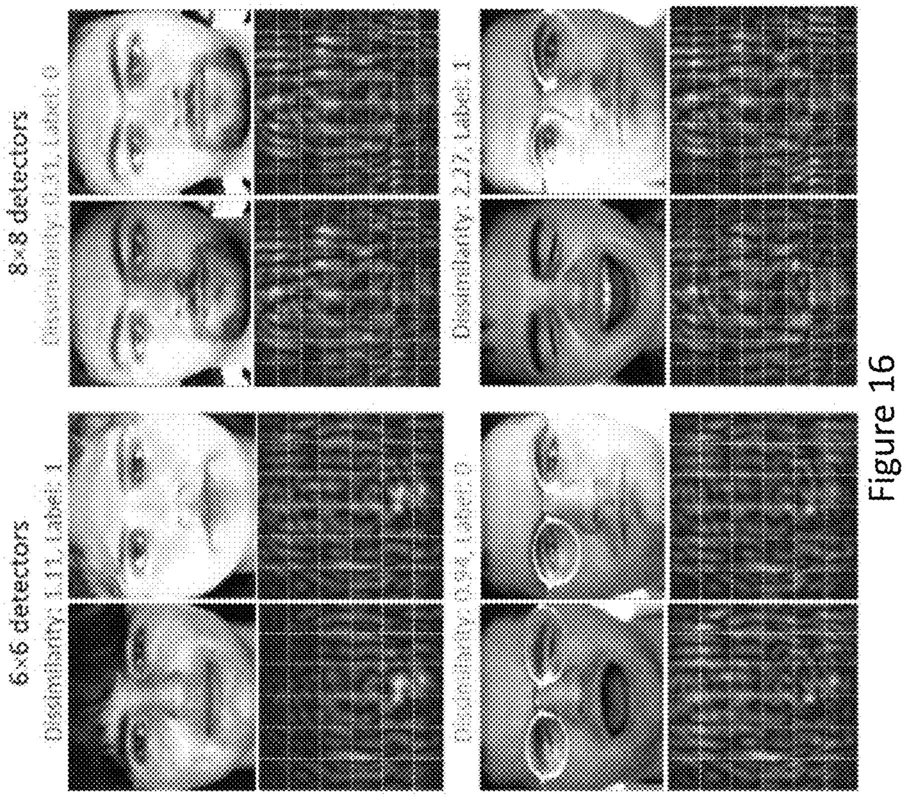
FIG. 16 provides images showing example facial verification cases with ONNs based on a single layer of metasurface and different barcode sizes.

FIG. 16 shows the facial verification with ONNs based on a single layer of metasurface and different barcode sizes. (Left column) Two examples of facial verification using barcodes of size 6×6. (Right column) Two examples of facial verification using barcodes of size 8×8.

Figure 17A:
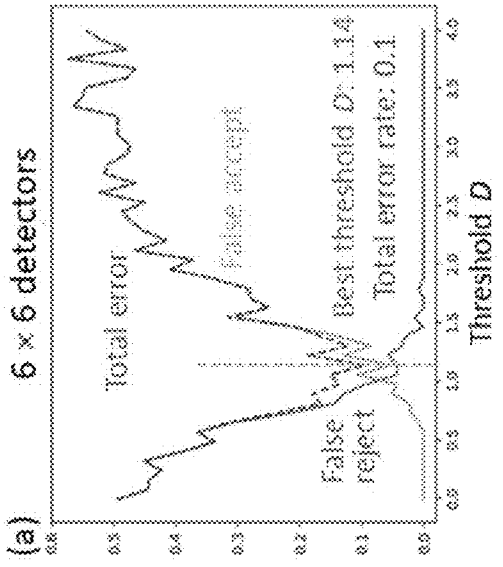
FIGS. 17A-17C provide graphs showing error rate diagrams as a function of the barcode size for ONNs based on metasurface doublets.
Figure 17B:
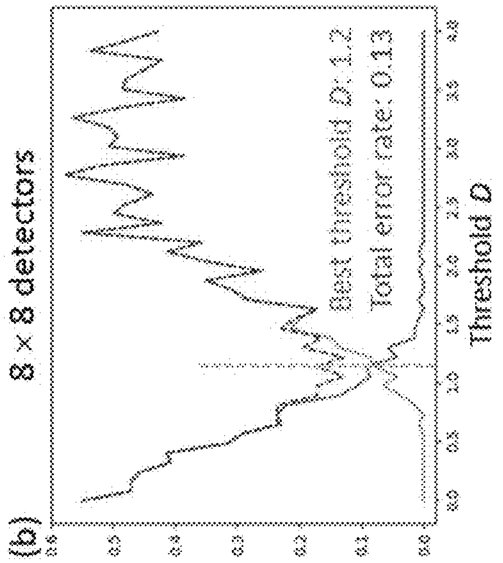
Figure 17C:
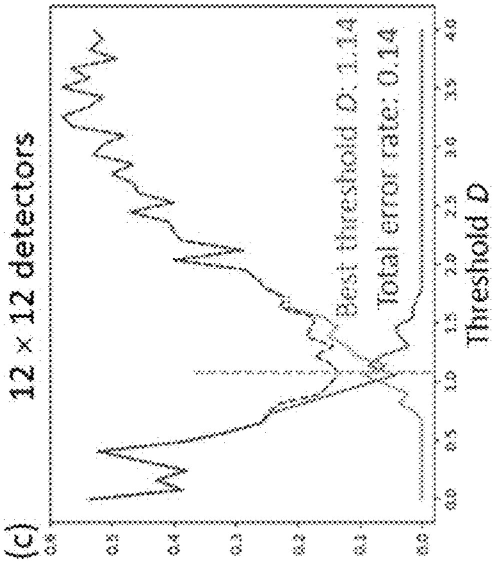

FIGS. 17A-17C show the error rate diagrams as a function of the barcode size for ONNs based on metasurface doublets. A minimal total error rate of 10% or verification accuracy of 90% is achieved with a barcode size of 6×6.

There is a compromise between verification accuracy and the degree of optical concentration on the output plane: In practical implementations of the metasurface ONN, instead of mapping the detailed optical scattering pattern on the output plane using a camera, the optical output is detected by a small number of discrete photodetectors and light that falls on the active area of each of the photodetectors can be integrated. Therefore, it is beneficial that the optical scattering pattern can be concentrated near the centers of the pre-defined zones. To control the degree of concentration of the optical scattering pattern, marginal regions were added between adjacent detection zones on the output plane and revised the loss function used for training the ONN by including an auxiliary term:

$$\text{Loss function} = (1-Y)D^2 + Y[\max(0, m-D)]^2 - \text{auxiliary}, \quad (4)$$

$$\text{auxiliary} = w \times \frac{\text{optical intensity in detection zones}}{\text{total optical intensity on output plane}}, \quad (5)$$

where w is a weight, and a larger weight can favor designs capable of producing a higher degree of optical concentration within the detection zones.

Figure 18C:
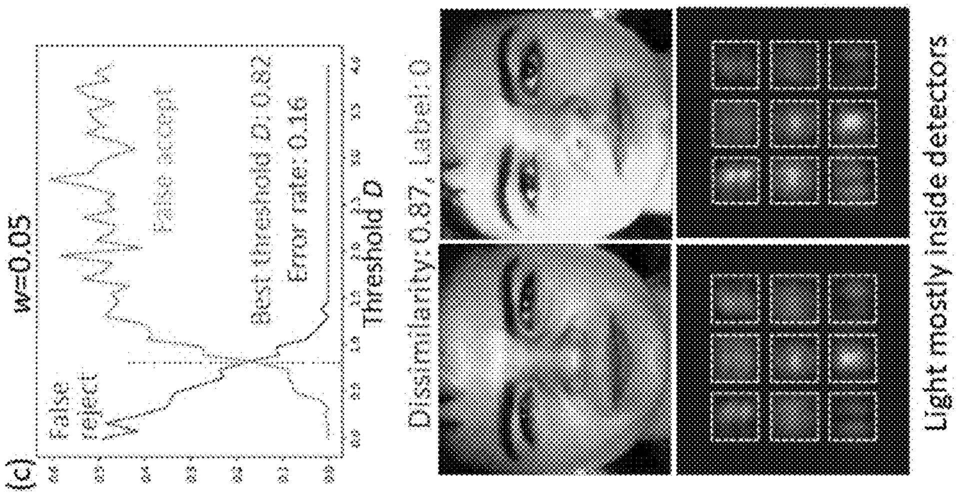
FIGS. 18A-18C show graphs and images showing the comparison of one-layer metasurface ONN designs with different degrees of concentration of the optical scattering patterns within the prescribed detection zones.
Figure 18B:
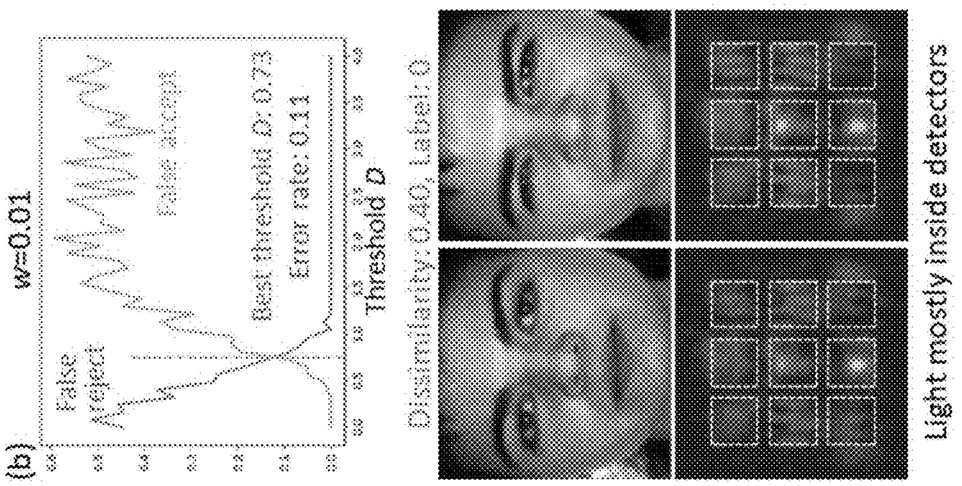
Figure 18A:
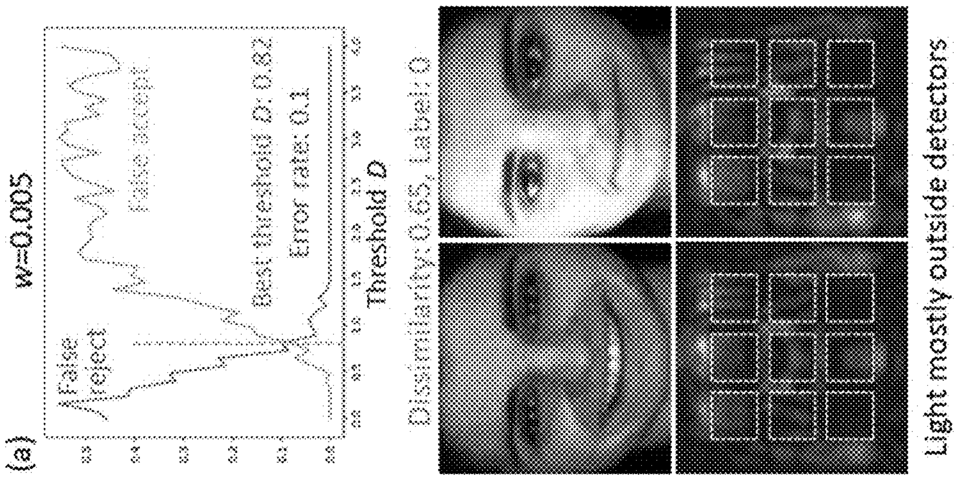

FIG. 18 shows the results of three ONNs based on a single metasurface with different values of weight. When w was increased moderately from 0.005 to 0.01, the error rate did not change significantly, but the optical scattering pattern became much more concentrated in the 9 isolated detection zones (FIG. 18(*b*), lower panel), which is conducive to optical detection. However, if w was increased substantially by one order of magnitude from 0.005 to 0.05 (FIG. 18(*c*)), the error rate increased significantly so that the verification accuracy dropped from 80% when w=0.005 to 100%-2× 16%=68% when w=0.05.

FIG. 18 Comparison of one-layer metasurface ONN designs with different degrees of concentration of the optical scattering pattern. From (a) to (c), the weight w in the loss function progressively increases, resulting in an increased concentration of optical power in the 3×3 detection zones, which is in favor of optical detection by discrete photodetectors. However, the verification accuracy can significantly decrease if w is too large (top panel in (c)). Indeed, the facial verification example shown in the bottom panel of (c) is a case of verification error: the ground-truth label ("Label 0") indicates that the two photos belong to the same individual; however, the calculated Euclidean distance between the barcodes of the two photos is larger than the optimal threshold D of 0.82 ("Dissimilarity: 0.87"). Intermediate values of w (such as the case in (b)) can reach a good compromise between a high verification accuracy and a high optical concentration. A similar trend was observed in ONNs based on metasurface doublets (FIG. 19).

Figures 19A, 19B, 19C:
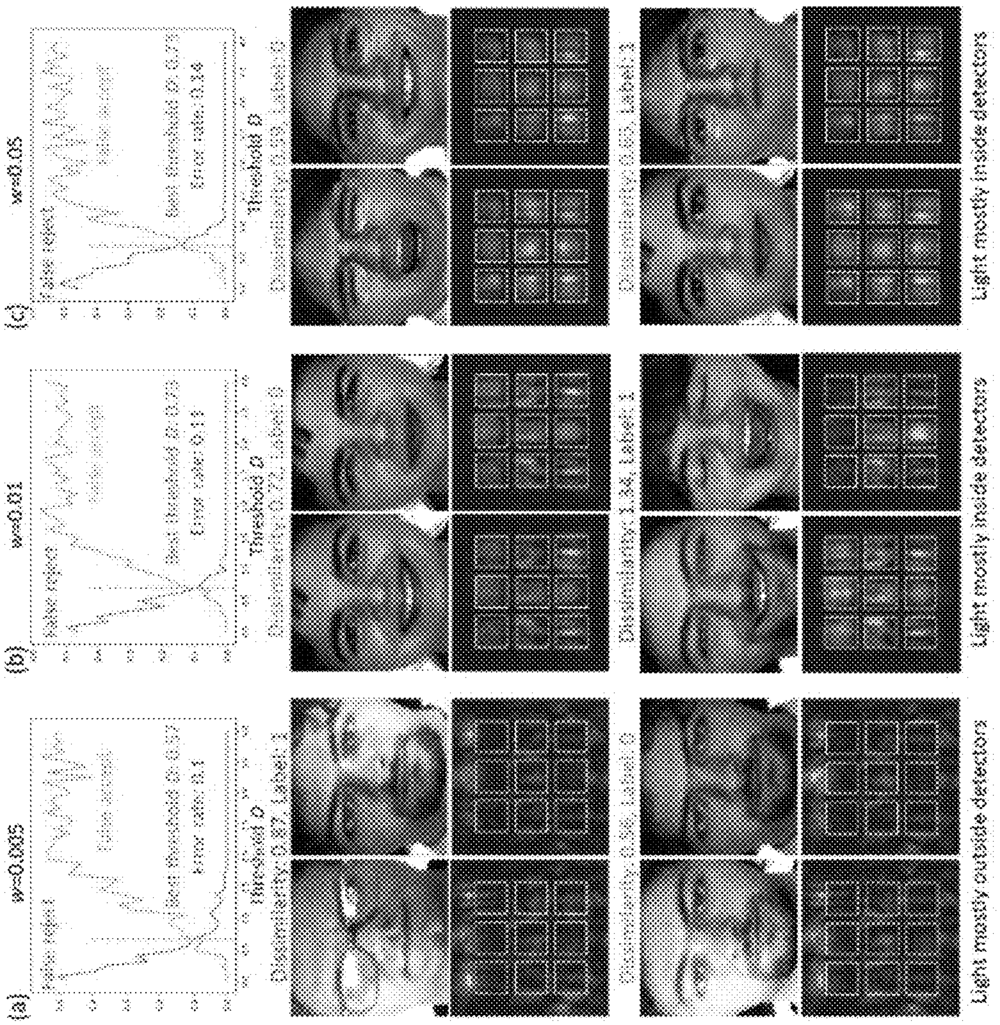
FIGS. 19A-19C show graphs and images showing the comparison of metasurface-doublet ONN designs with different degrees of concentration of the optical scattering patterns.

FIG. 19 shows the comparison of metasurface-doublet ONN designs with different degrees of concentration of the optical scattering pattern. From (a) to (c), the weight w in the loss function progressively increases, leading to increasing optical concentration within the 3×3 isolated zones. However, the verification accuracy can suffer if w is too large (e.g., w=0.05 in (c)). For instance, the second facial verification example in (c) shows a case of erroneous verification: the photos obviously belong to a female and a male individual ("Label 1"); however, probably because of the similar photo exposure level and similar neural facial expression, the calculated dissimilarity between the two photos was below the optimal threshold D=0.73 ("Dissimilarity: 0.65"), so that the two photos were regarded as a "genuine" pair by the ONN, which was a mistake.

Partial facial coverage decreases verification accuracies: FIG. 20 reports a comparison between two ONNs designed to verify photos with and without facial coverage, respectively. The configurations of the ONNs, including the sizes of their components and distances between the components, are the same, the only difference being the photos they were trained to analyze. The error rate was increased by approximately a factor of two in the presence of partial facial coverage. Facial coverage masks a portion of the facial features, and a partial or incomplete set of facial features lead to reduced verification accuracy. It is nevertheless encouraging to see that the ONN can still work for the more challenging task.

Figures 20A, 20B, 20C, 20D, 20E, 20F, 20G:
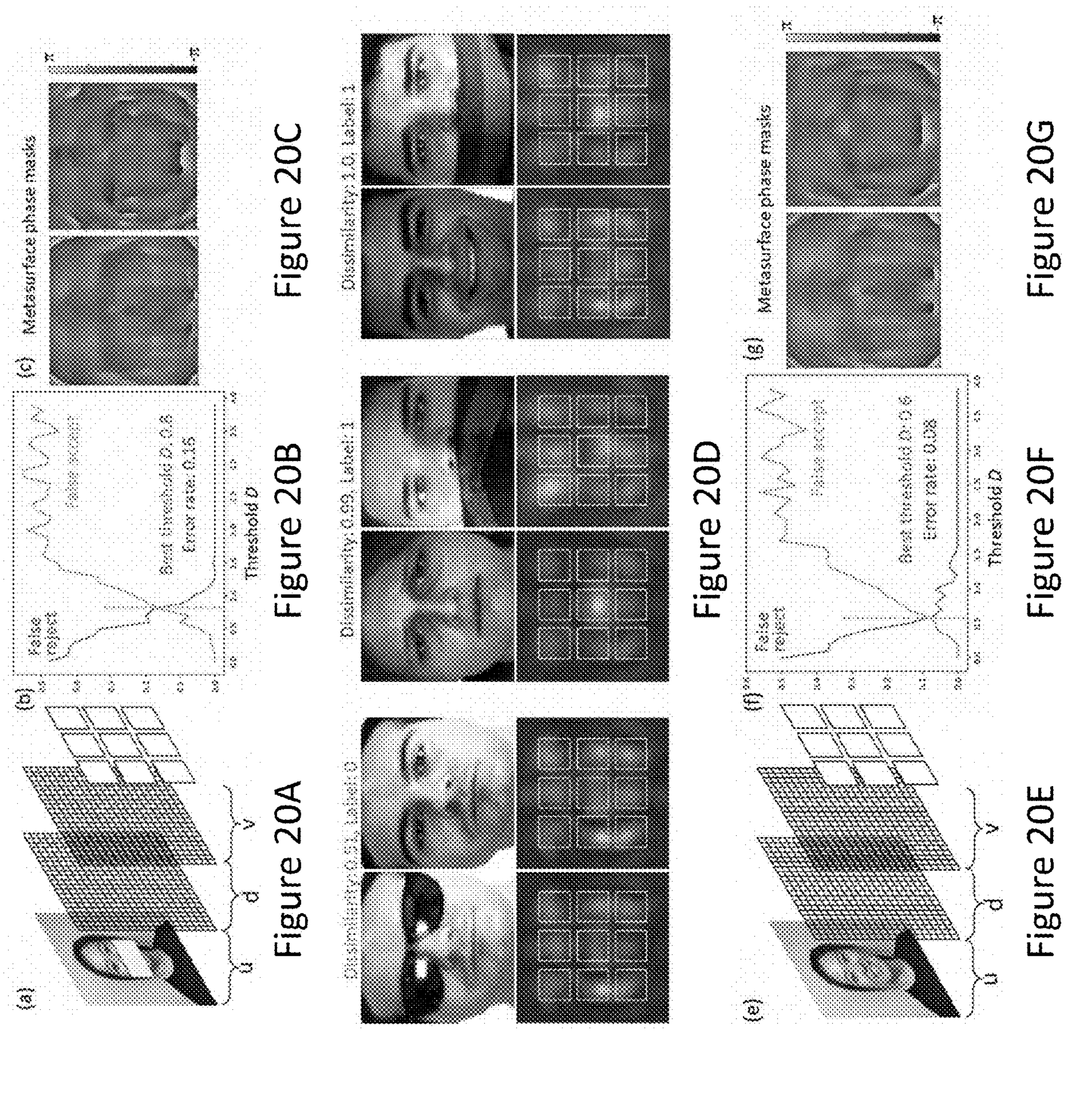
FIG. 20A provides a schematic of an ONN for verifying photos with partial facial coverage.
FIG. 20B shows an error rate diagram showing that at the optimal threshold Euclidean distance of D=0.8, a minimal total error rate of 32% (consisting of 16% false rejection and 16% false acceptance) is achieved.
FIG. 20C shows the trained phase distributions over the two metasurfaces for this ONN.
FIG. 20D shows examples of correct facial verification using this ONN.
FIG. 20E shows a schematic of a second ONN for verifying facial photos without a facial cover.
FIG. 20F shows an error rate diagram showing that the minimum total error rate of 16% (i.e., 8% false rejection and 8% false acceptance) is lower than the previous case.
FIG. 20G shows the trained phase distributions over the two metasurfaces for the second ONN.

FIG. 20 shows the design and performance of an ONN with a metasurface doublet for verifying photos of partially covered faces. FIG. 20A shows a schematic of an ONN for verifying photos with partial facial coverage. Detailed design parameters are: u=d=v=5000λ, meta-unit sizes: 0.5λ×0.5λ, metasurface sizes: 500λ×500λ, and input photo sizes: 500λ×500λ. FIG. 20B shows the error rate diagram showing that at the optimal threshold Euclidean distance of D=0.8, a minimal total error rate of 32% (consisting of 16% false rejection and 16% false acceptance) is achieved. FIG. 20C shows the trained phase distributions over the two metasurfaces for this ONN. FIG. 20D shows three examples of correct facial verification using this ONN. FIG. 20E shows a schematic of a second ONN for verifying facial photos without a facial cover. FIG. 20F shows the error rate diagram showing that the minimum total error rate of 16% (i.e., 8% false rejection and 8% false acceptance) is lower than the previous case. FIG. 20G shows the rained phase distributions over the two metasurfaces for the second ONN.

Classification of Optically Incoherent Images: Recognition of optically incoherent objects, which are more prevalent in everyday life compared to coherent ones, is a challenging task. The expressive power of a metasurface is reduced when processing incoherent light: optical interference produces cross-product terms between optical fields emitted from points of a coherent object, and this cross-production represents a form of nonlinearity in the disclosed ONN. However, this nonlinearity is lacking in the case of incoherent light, where there is just a linear sum of optical intensity patterns produced by different portions of a target object.

Figures 21A, 21B, 21C:
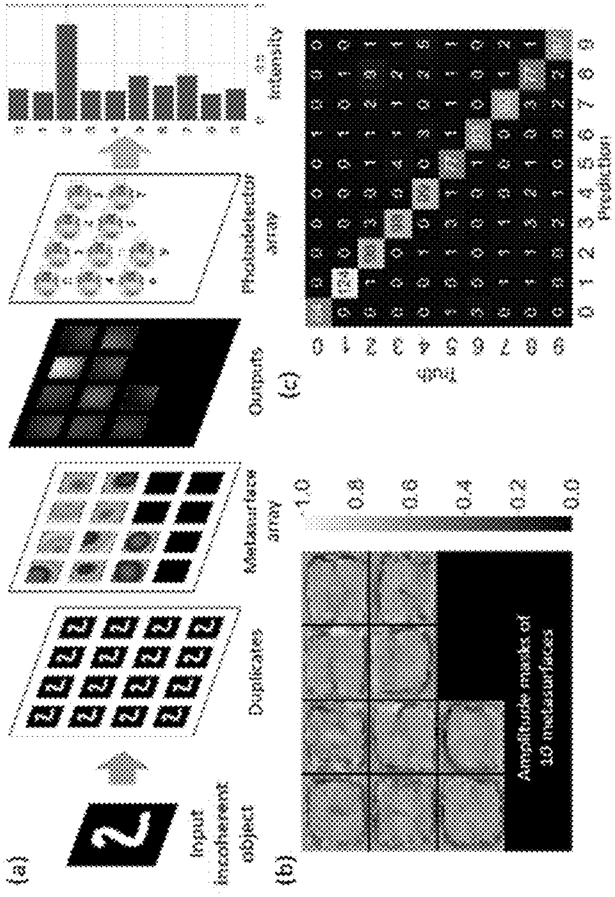
FIG. 21A provides a schematic of an ONN with N channels, each consisting of a replica of the initial image, a unique metasurface, and a single-pixel detector capable of classifying N classes of optically incoherent images.
FIG. 21B shows amplitude masks of 10 metasurfaces simultaneously trained for recognizing optically incoherent handwritten digits in the MNIST dataset.
FIG. 21C shows a confusion matrix summarizing the results of recognizing the 10 classes of handwritten digits with an overall accuracy of 92%.

An ONN using a parallel array of metasurfaces was presented to address the challenge of recognizing optically incoherent images. FIG. 21 illustrates a design for classifying 10 classes of incoherent objects (i.e., MNIST handwritten digits). In this scheme, an input object is first duplicated (either physically by a 2D grating or digitally by a display) to create N replicas, N being the number of classes of objects (N=10 in this example); each replica is then processed by one unique metasurface (among an array of N metasurfaces, FIG. 21B, the output light from which is focused onto a single-pixel photodetector; finally, the detector receiving the highest optical intensity can determine the classification of the input object (FIG. 21(*a*)). The metasurface array has largely boosted expressive power compared to a single metasurface or metasurface doublet; as a result, the disclosed ONN demonstrated an accuracy of 92% in classifying incoherent MNIST digits (FIG. 21(*c*)). This is greatly improved from an accuracy of ~50% by using only one metasurface doublet (data not shown).

FIG. 21 shows the ONN based on a metasurface array for classifying optically incoherent images. FIG. 21A shows a schematic of the ONN with N channels, each consisting of a replica of the initial image, a unique metasurface, and a single-pixel detector capable of classifying N classes of optically incoherent images. FIG. 21B shows the amplitude masks of 10 metasurfaces simultaneously trained for recognizing optically incoherent handwritten digits in the MNIST dataset. FIG. 21C shows the confusion matrix summarizing the results of recognizing the 10 classes of handwritten digits with an overall accuracy of 92%.

Figure 24:
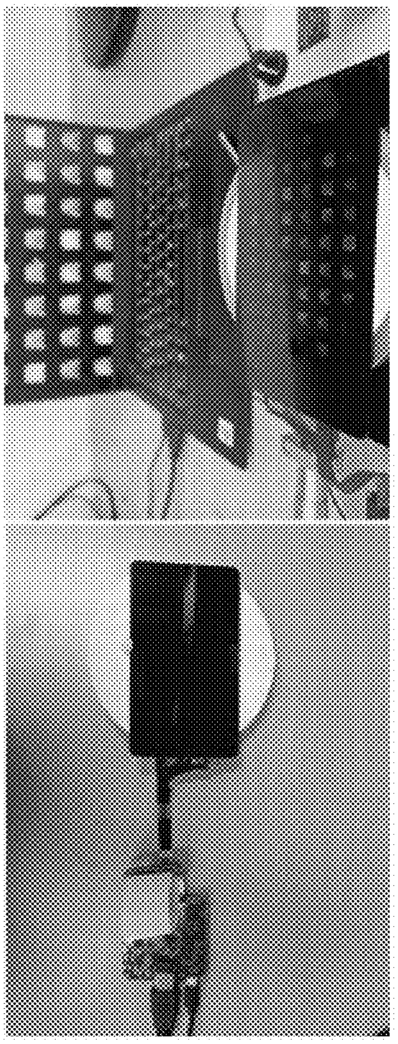
FIG. 24 provides photos showing generation of optically coherent facial images by using an LCD.
Figure 25:
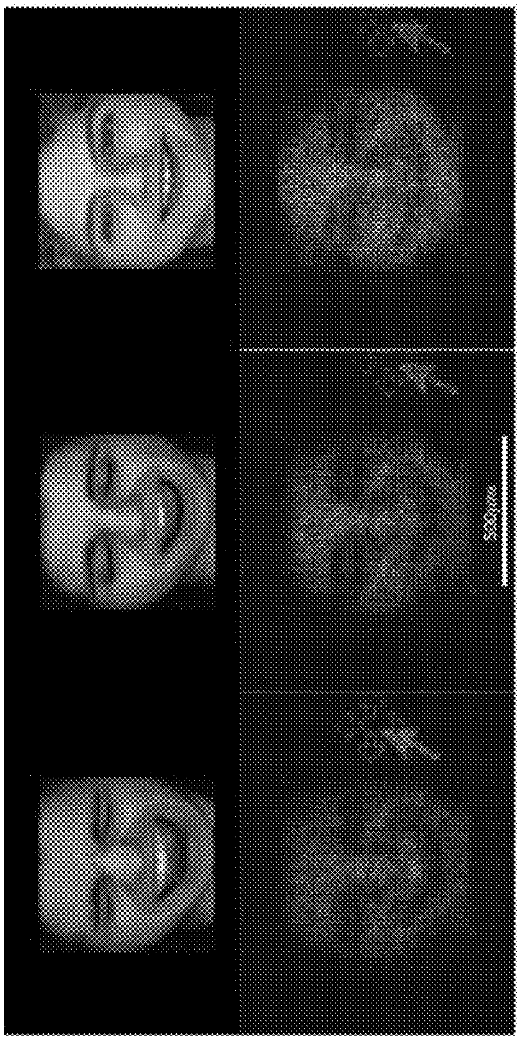
FIG. 25 provides original digital facial images and corresponding optically coherent input images for the disclosed ONNs generated by shining a collimated and expanded laser beam through the TFT-LCD operated as a grayscale transmission mask.

Optically coherent facial images were generated using two methods. In the disclosed earlier approach, grayscale images were printed on a transparency (FIG. 22), and coherent input images for the ONN were created by shining a collimated and expanded near-infrared (λ=1.55 μm) laser beam through the transparency (middle panel of FIG. 23). A motorized translation stage was used to move one image into the optical path each time. In the disclosed more recent approach, a commercial thin-film-transistor liquid-crystal display (TFT-LCD) was reconfigured to enable the generation of coherent images at a high rate for more rapid characterization of the ONNs. Specifically, the original incoherent white backlight module was removed, and a suspended LCD controllable was created via a laptop computer (FIG. 24). The spectral transmission of the LCD pixels was calibrated as a function of the applied voltage and decided to operate the LCD at λ=750 nm (far-red), because of the large modulation amplitude at this wavelength. Coherent images were then created by shining a collimated and expanded far-infrared (λ=750 nm) laser beam through the LCD (FIG. 25).

Figure 22A:
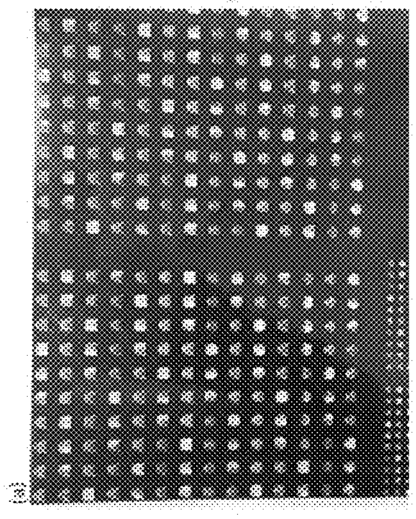
FIG. 22A shows arrays of facial images printed on a transparency.
Figure 22B:
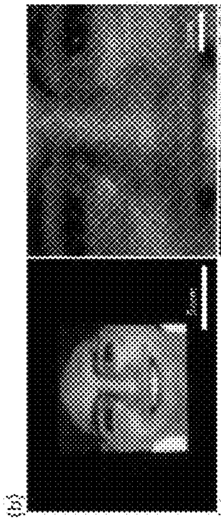
FIG. 22B shows an example of a "large" image with dimensions of 10 mm×10 mm, consisting of 120×120 pixels.
Figure 22C:
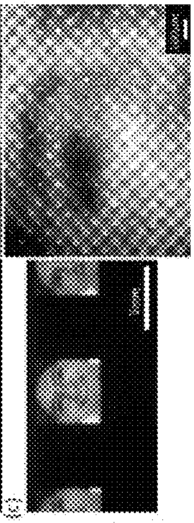
FIG. 22C shows an example of a "small" image with dimensions of 5 mm×5 mm, consisting of 60×60 pixels.

FIG. 22 shows that generating optically coherent facial images by using transparency. FIG. 22A shows arrays of facial images printed on a transparency, illuminating from the backside by an expanded laser beam, which generates optically coherent input images for the disclosed ONNs. FIG. 22B shows an example of a "large" image with dimensions of 10 mm×10 mm, consisting of 120×120 pixels. The right panel is a zoom-in of the left panel. FIG. 22C shows an example of a "small" image with dimensions of 5 mm×5 mm, consisting of 60×60 pixels. The right panel is a zoom-in of the left panel.

Figure 23:
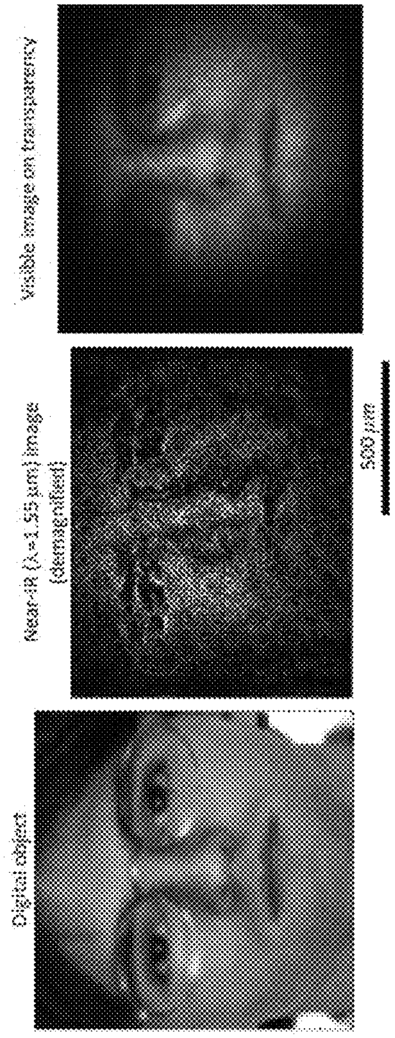
FIG. 23 provides optically coherent facial images.

FIG. 23 shows optically coherent facial images (Left: Initial digital image; Middle: Demagnified near-infrared (λ=1.55 μm) image created by the transparency as an input for the ONNs; Right: The same image on the transparency illuminated by a green light).

FIG. 24 shows the generation of optically coherent facial images by using an LCD (Left: Photo of a TFT-LCD with its white backlight module taken off and connected to an HDMI-to-MIPI LCD controller. Right: Using the TFT-LCD as a fast grayscale transmission mask to generate optically coherent input images for the disclosed ONNs). In FIG. 25, the Top row shows the original digital facial images. The bottom row shows corresponding optically coherent input images for the disclosed ONNs generated by shining a collimated and expanded laser beam at λ=750 nm through the TFT-LCD operated as a grayscale transmission mask.

Figure 26:
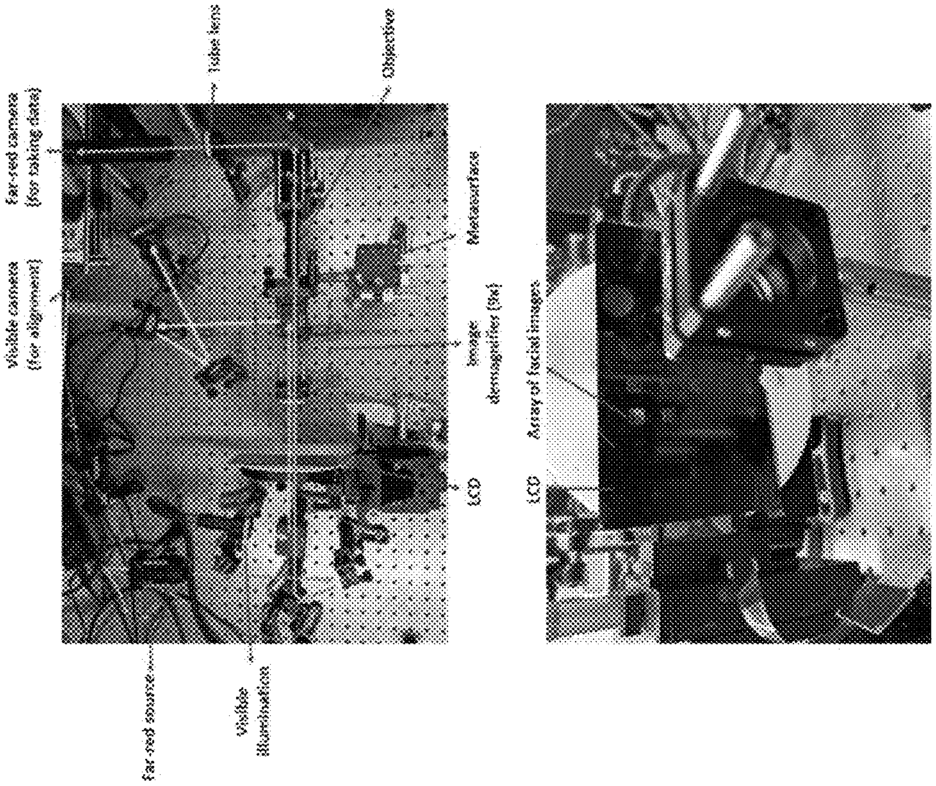
FIG. 26 provides photos of the disclosed optical setup for characterizing ONNs.

FIG. 26 shows photos of the disclosed current optical setup. It consists of a tunable coherent light source (a supercontinuum laser in combination with a monochromator, not shown in the photos), the LCD transmission mask, an image demagnifier to decrease the size of the input images, a metasurface ONN, and imaging optics (objective, tube lens, and infrared camera).

Figure 27:
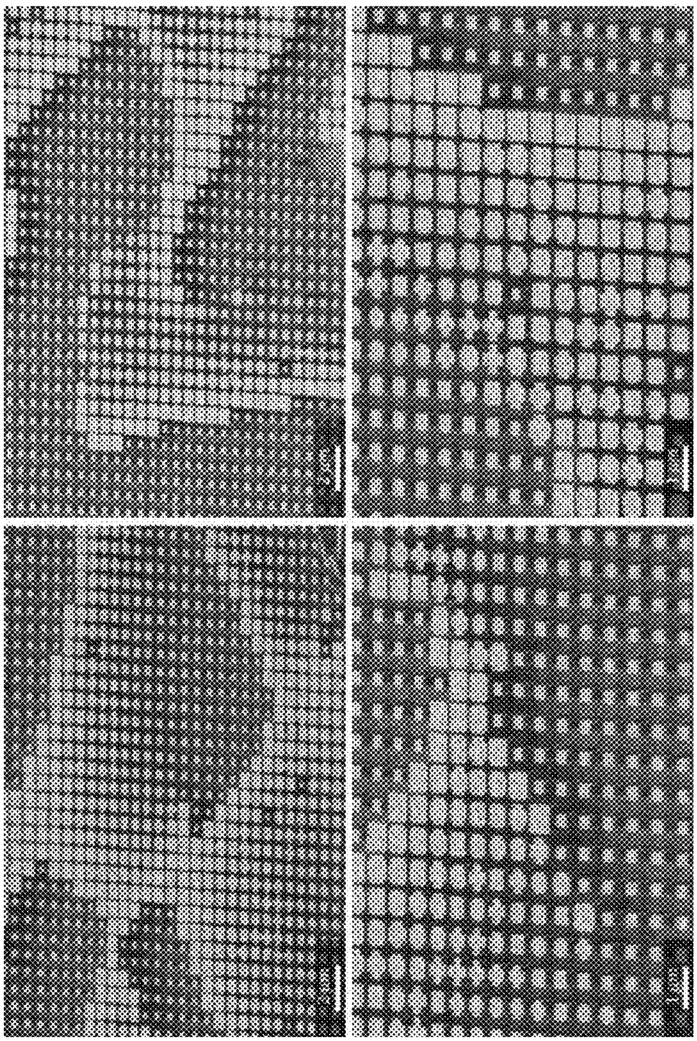
FIG. 27 provides SEM images of fabricated metasurface ONNs to realize the performance shown in FIGS. 18B and 19B.

FIG. 27 shows a few scanning electron micrographs (SEMs) of fabricated metasurfaces. These metasurfaces are components of ONNs with 3×3 isolated detection zones, and their simulated performance is shown in FIGS. 18(*b*) and 19(*b*). The metasurfaces are fabricated with standard clean-room fabrication techniques as follows: (1) Plasma-enhanced chemical vapor deposition (PECVD) of thin silicon films on glass carrier substrates, (2) Electron-beam lithography (EBL) to define etch masks, and (3) Reactive-ion etching (RIE) to transfer the metasurface pattern through the masks into the silicon, forming a binary nanostructured thin film or a metasurface.

Figure 28:
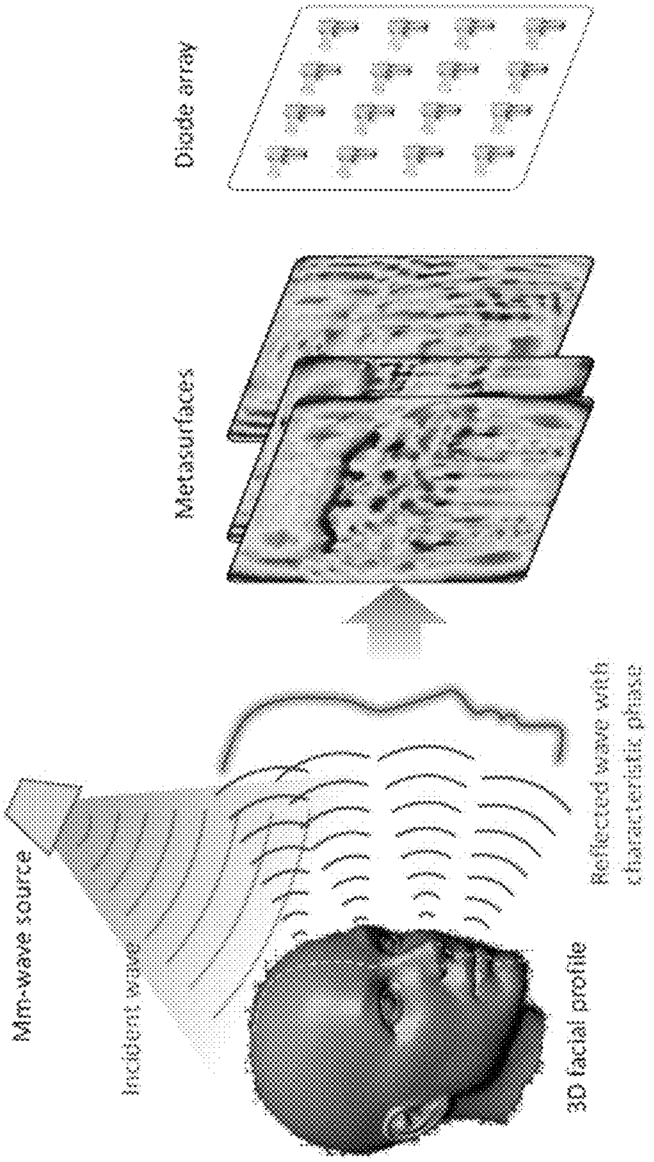
FIG. 28 provides a diagram showing an example high-accuracy, high-security personal identification system, which utilizes an ONN to convert 3D facial profiles into characteristic barcodes.

One can see from FIG. 27 that a metasurface is composed of a 2D array of densely-packed, nanoscale optical scatters ("meta-units"). Each meta-unit can modify the properties of light differently, and as a result of their collective action, metasurfaces can realize arbitrary wavefront shaping, which is ideally suited for the purpose of the ONN. The flat form factor of metasurfaces and the CMOS compatibility of their fabrication allows them to be fabricated with mature planar fabrication technologies developed by the integrated circuits industry with high throughput and high yield and benefit from economies of scale. FIG. 27 shows scanning electron micrographs of fabricated metasurface ONNs to realize the performance shown in FIGS. 18(*b*) and 19(*b*). Each metasurface is composed of a 2D array of silicon nanopillars ("meta-units") with various cross-sectional sizes and shapes patterned on a glass substrate. Each metasurface has a dimension of ~500 μm×500 μm and contains ~1 million meta-units. FIG. 28 shows that an example personal identification system using the disclosed subject matter, which utilizes an ONN to convert 3D facial profiles into characteristic barcodes. Mm-waves can be used for illumination to translate a 3D facial profile into a molded wavefront.

Two advantages of ONNs compared to digital ANNs are their fast computing speed and low power consumption. Here, quantitative estimates of these two specifications of the ONN were provided:

(1) Computing time: Computing in the disclosed ONNs is realized by the scattering and propagation of light waves; therefore, the computing time can be estimated as the sum of (a) the time light travels through the disclosed ONNs, which is ~100 ps ($100\times10^{-12}$ seconds), (b) the response time of photodiodes used to convert optical barcodes into electrical barcodes, which is ~500 ps, and (c) the time that a simple analog circuit needs to compare two electrical barcodes, which can be as quick as ~50 ns. Therefore, the ONN computing speed is ultimately limited by the analog circuit. However, this is still orders of magnitude faster than ANNs, the computing time of which is determined by (a) the response time of the digital camera sensor, (b) the time needed for analog-to-digital conversion (ADC), and (c) the computation time of the digital neural circuit; all three are on the order of milliseconds. Therefore, ONNs can be $10^5$-$10^6$ times faster than ANNs.

(2) Power consumption: A single photodiode consumes ~100 pW power; facial verification uses 10-100 photodiodes; therefore, the total power consumption for light detection is 1-10 nW. A simple analog circuit for comparing barcodes consumes 10-100 μW. Overall, an ONN can be operated with sub-mW power. However, ANNs easily consume tens of watts of power (primarily by microprocessors). Therefore, ONNs can be $10^4$-$10^5$ times more power efficient than ANNs.

An efficient and effective system was developed to develop and validate ONN designs. This system includes (a) a design and optimization algorithm, (b) methodology to determine the accuracy of the designs, (c) a metasurface platform to implement the designs, and (d) an experimental setup to test recognition accuracies.

For the task of verifying optically coherent facial images, ONNs consisting of one metasurface and those consisting of a metasurface doublet can both reach high accuracies of ~90% (FIGS. 15(*c*) and 17(*a*)), which is comparable to the performance of a digital ANN with three fully connected convolutional layers. This high accuracy is achieved with an extremely compact device (a stack of thin metasurfaces, a small array of photodetectors, and a simple analog circuit), with power consumption at least four orders of magnitude lower than digital ANNs and computing speed at least five orders of magnitude faster than ANNs.

For classifying optically incoherent images, an array of N metasurfaces with N comparable to the number of classes have to be trained together to accomplish the task. This strategy has been utilized to demonstrate an ONN that can classify 10 classes of handwritten digits with >90% accuracy (FIG. 21(*c*)).

While it will become apparent that the subject matter herein described is well calculated to achieve the benefits and advantages set forth above, the presently disclosed subject matter is not to be limited in scope by the specific embodiments described herein. It will be appreciated that the disclosed subject matter is susceptible to modification, variation, and change without departing from the spirit thereof. Those skilled in the art will recognize or be able to ascertain, using no more than routine experimentation, many equivalents to the specific embodiments described herein. Such equivalents are intended to be encompassed by the following claims.

What is claimed is:

1. A system for processing light, comprising:

one or more substrates; and a plurality of meta-units, patterned on each of the substrates and configured to modify a phase, an amplitude, or a polarization of the light with a subwavelength resolution, wherein the system is in a form of a diffractive neural network and is configured to perform target recognition;

wherein the system is configured to operate without a power supply.

2. The system of claim 1, wherein the light is scattered by a two-dimensional image.

3. The system of claim 1, wherein the light is scattered by a three-dimensional object.

4. The system of claim 1, wherein the light comprises a wavelength between an ultraviolet region to a microwave spectral region.

5. The system of claim 1, wherein the system is configured to operate at a speed of light.

6. The system of claim 1, wherein the system is configured to bypass digitalization of a target and immune against a security breach.

7. The system of claim 1, wherein the plurality of meta-units comprises a dielectric material, wherein the dielectric material is selected from the group consisting of silicon, silicon nitride, silicon-rich silicon nitride, titanium dioxide, plastics, plastics doped with ceramic powders, ceramics, polytetrafluoroethylene (or PTFE), and FR-4 (a glass-reinforced epoxy laminate material).

8. The system of claim 1, wherein the plurality of meta-units comprises an actively tunable material, wherein the actively tunable material is selected from the group consisting of an electro-optical material, a thermo-optical material, a phase change material, and combinations thereof, wherein the electro-optical material comprises silicon and/or lithium niobate, wherein the thermo-optical material comprises silicon and/or germanium, wherein the phase change material comprises vanadium dioxide.

9. The system of claim 1, wherein the plurality of meta-units forms an optically isotropic library, wherein the isotropic library has a cross-section with a four-fold symmetry.

10. The system of claim 1, wherein the plurality of meta-units forms a birefringent library, wherein the birefringent library has a cross-section with a two-fold symmetry.

11. The system of claim 1, further comprising an output plane, wherein the output plane comprises at least one detection zone.

12. The system of claim 11, wherein the system is configured to recognize a target by scattering light into a predetermined detection zone on the output plane more efficiently compared to scattering light into other detection zones.

13. The system of claim 11, wherein the system is configured to recognize a target by scattering light into an optical barcode in the form of a specific intensity distribution over the at least one detection zones on the output plane.

14. The system of claim 1, further comprising one or more detectors of the light.

15. A method for processing light, comprising:

propagating light scattered from a target onto an output plane through a diffractive neural network, wherein the diffractive neural network is fabricated by lithographic planar fabrication, micromachining, or 3D printing, and comprises one or more substrates and a plurality of meta-units, patterned on each of the substrates and configured to modify a phase, an amplitude, or a polarization of the light; and identifying the target based on detecting a light intensity distribution on the output plane by using one or more detectors.

16. The method of claim 15, wherein the plurality of meta-units forms an optically isotropic library or a birefringent library, wherein the isotropic library has a cross-section with a four-fold symmetry, wherein the birefringent library has a cross-section with a two-fold symmetry.

17. The method of claim 15, further comprising training the diffractive neural network in an iterative way, wherein each iteration comprises feeding a training set comprising one or more two-dimensional images or three-dimensional objects into the diffractive neural network, calculating propagation of light waves through the diffractive neural network, obtaining an intensity distribution over one or more detection zones on the output plane;

evaluating a loss function, wherein the loss function is a discrepancy between the calculated intensity distribution over the one or more detection zones and a target-specific optical barcode; and adjusting the choice and arrangement of meta-unit on each of the substrates to minimize the loss function.

18. The method of claim 15, further comprising choosing a configuration of the diffractive neural network to improve a target recognition accuracy, wherein the configuration includes a wavelength of light, an incident angle, a wavefront of light, a number and size of the substrates, a spacing between the substrates, a number and a footprint of meta-units on each substrate, a spacing between a last substrate and the output plane, a number and arrangement of detection zones on the output plane, or combinations thereof.

* * * * *